US006659867B1

(12) United States Patent
Kodachi et al.

(10) Patent No.: US 6,659,867 B1
(45) **Date of Patent: *Dec. 9, 2003**

(54) GAMING MACHINE

(75) Inventors: Kazuyoshi Kodachi, Tokyo (JP); Humio Nakano, Tokyo (JP)

(73) Assignee: Aruze Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/452,363

(22) Filed: Nov. 30, 1999

(30) Foreign Application Priority Data

Apr. 21, 1999 (JP) .......................................... 11-113049

(51) Int. Cl.$^{7}$ ................................................ A63F 13/00

(52) U.S. Cl. ........................ 463/20; 463/16; 273/143 R

(58) Field of Search ........................ 273/143 R; 463/16, 463/20–22

(56) References Cited

U.S. PATENT DOCUMENTS

| | | | | |
|---|---|---|---|---|
| 4,695,053 A | * | 9/1987 | Vazquez, Jr. et al. | 273/143 R |
| 4,836,546 A | * | 6/1989 | DiRe et al. | 273/138 A |
| 4,858,932 A | * | 8/1989 | Keane | 273/143 R |
| 5,018,737 A | | 5/1991 | Okada | 273/143 R |
| 5,024,439 A | | 6/1991 | Okada | 273/143 R |
| 5,630,753 A | | 5/1997 | Fuchs | 463/9 |
| 5,695,188 A | * | 12/1997 | Ishibashi | 273/143 R |
| 6,089,980 A | * | 7/2000 | Gauselmann | 463/27 |
| 6,142,874 A | * | 11/2000 | Kodachi et al. | 463/20 |
| 6,142,875 A | * | 11/2000 | Kodachi et al. | 463/20 |
| 6,213,875 B1 | * | 4/2001 | Suzuki | 463/20 |

FOREIGN PATENT DOCUMENTS

| | | | | |
|---|---|---|---|---|
| EP | 0414 427 A2 | | 8/1990 | G07F/17/34 |
| EP | 0875 870 A2 | | 4/1998 | G07F/17/32 |
| EP | 0921 504 A2 | | 12/1998 | G07F/17/32 |
| GB | 2054232 A | * | 2/1981 | |
| GB | 2069657 A | * | 8/1981 | |
| GB | 2144568 A | * | 3/1985 | |

* cited by examiner

*Primary Examiner*—Jessica Harrison
*Assistant Examiner*—Carmen D. White
(74) *Attorney, Agent, or Firm*—Rohm & Monsanto, P.L.C.

(57) ABSTRACT

A gaming machine has a principal display that displays a plurality of symbols in varying and stopped states. The player is rewarded when the stop state corresponds to a specific stop state. A predictive display displays whether the specific stop state is to be displayed. Start and stop devices are manipulated by a player, and a controller determines whether the specific stop state is to be permitted and a predictive display mode based on the result of the determination. The controller determines whether the likelihood of appearance of the specific stop state is changeable in conjunction with a change in the game resulting from the passage of time. The player adjusts the stop manipulation while confirming changes of the predictive display or expecting the appearance of a known predictive display. In this manner, an effective variable demonstration is achieved, and the fun of the game is enhanced.

15 Claims, 53 Drawing Sheets

FIG. 2
FACE PROGNOSTIC DETERMINATION TABLE ("BB HIT + CLAPPING REACH")
| PROGNOSTIC GROUP | RANDOM NUMBER FOR PROGNOSTIC DISPLAY DETERMINATION | |
|---|---|---|
| A GROUP | 0~40 | 41~80 |
| | FACE SYMBOL 1  | FACE SYMBOL 2  |
| B GROUP | 81~96 | 97~110 |
| | FACE SYMBOL 3  | FACE SYMBOL 4  |
| C GROUP | 111~115 | 116~119 |
| | FACE SYMBOL 5  | FACE SYMBOL 6  |
| D GROUP | 120~129 | 130~139 |
| | FACE SYMBOL 7  | FACE SYMBOL 8  |

FIG. 4

| WINNING PATTERN | WINNING RESULT |
|---|---|
| 7－7－7 | PAY OUT 15 COINS + BB |
| 3－3－3 | PAY OUT 15 COINS + RB |
| 5－5－5 | PAY OUT 15 COINS |
| 9－9－9 | PAY OUT 8 COINS |
| 1－1－1<br>8－8－8 | PAY OUT 4 COINS |
| 2 - 2 - 2 | PAY OUT 2 COINS |
| 6－6－6 | REPLAY |

FIG. 11

| KIND OF RANDOM NUMBER | RANDOM NUMBER VALUE |
| --- | --- |
| RANDOM NUMBER FOR WINNING RANK DETERMINATION | 0~16383 |
| RANDOM NUMBER FOR "REACH" DEMO. DETERMINATION | 0~139 |
| RANDOM NUMBER FOR FIRST OR SECOND PROGNOSTIC DISPLAY DETERMINATION | 0~39 |
| RANDOM NUMBER FOR "REACH" PERMISSION DETERMINATION | 0~1 |

FIG. 12

WINNING RANK DETERMINATION TABLE

| WINNING RANK (HIT FLAG) | BB | RB | 15 COINS RANK | 8 COINS RANK | 4 COINS RANK | 2 COINS RANK | REPLAY | "LOSS" |
|---|---|---|---|---|---|---|---|---|
| RANDOM NUMBER FOR WINNING RANK DETERMINATION | 0~49 | 50~119 | 120~319 | 320~819 | 820~1319 | 1320~3819 | 3820~6064 | 6065~16383 |
| PROBABILITY | 50/16384 | 70/16384 | 200/16384 | 500/16384 | 500/16384 | 2500/16384 | 2245/16384 | 10319/16384 |

FIG. 13

"REACH" PERMISSION DETERMINATION TABLE

| | RANDOM NUMBER FOR "REACH" PERMISSION DETERMINATION |
|---|---|
| "REACH" PERMISSION | 0 |
| NO "REACH" PERMISSION | 1 |

FIG. 14

"REACH" DEMO. DETERMINATION TABLE FOR "BB HIT"

| KIND OF "REACH" | RANDOM NUMBER FOR "REACH" DEMO. DETERMINATION | PROBABILITY |
|---|---|---|
| "CLAPPING REACH" | 0~24 | 25/140 |
| "HARITE REACH" | 25~64 | 40/140 |
| "ALL ROTATION REACH" | 65~139 | 75/140 |

FIG. 15

"REACH" DEMO. DETERMINATION TABLE FOR NON-"BB HIT"

| KIND OF "REACH" | RANDOM NUMBER FOR "REACH" DEMO. DETERMINATION | PROBABILITY |
|---|---|---|
| "CLAPPING REACH" | 0~4 | 5/140 |
| "HARITE REACH" | 5~8 | 4/140 |
| NO "REACH" | 9~139 | 131/140 |

(I) "BB HIT + CLAPPING REACH"

(II) "BB HIT + HARITE REACH"

(III) "BB HIT + ALL ROTATION REACH"

(IV) "NO BB HIT + CLAPPING REACH"

(V) "NO BB HIT + HARITE REACH"

(VI) "NO BB HIT + NO REACH"

"CLAPPING REACH"

"HARITE REACH"

FACE PROGNOSTIC 1

64

FACE PROGNOSTIC 2

64

DRAGONFLY PROGNOSTIC

FIGHTING PROGNOSTIC

BEAR PROGNOSTIC

RIGHT LEG LIFTING PROGNOSTIC

LEFT LEG LIFTING PROGNOSTIC 6 4

SMALL DEGREE LEG LIFTING 6 4

FIG. 37

PROGNOSTIC DISPLAY DETERMINATION TABLE B

| COMBINATION OF "RESULT OF INTERNAL ELECTION" & "KIND OF REACH" | KIND OF PROGNOSTIC DISPLAY | RANDOM NUMBER FOR THIRD PROGNOSTIC DISPLAY DETERMINATION |
|---|---|---|
| (I) "BB HIT + CLAPPING REACH" | DRAGONFLY PROGNOSTIC | 0~20 |
| | FIGHTING PROGNOSTIC | 21~70 |
| | RIGHT LEG PROGNOSTIC | 71~80 |
| | LEFT LEG PROGNOSTIC | 81~89 |
| (II) "BB HIT + HARITE REACH" | DRAGONFLY PROGNOSTIC | 0~20 |
| | FIGHTING PROGNOSTIC | 21~40 |
| (III) "BB HIT + ALL ROTATION REACH" | DRAGONFLY PROGNOSTIC | 0~5 |
| | BEAR PROGNOSTIC | 6~60 |
| (IV) "NO BB HIT + CLAPPING REACH" | DRAGONFLY PROGNOSTIC | 81~85 |
| | FIGHTING PROGNOSTIC | 86~90 |
| | RIGHT LEG PROGNOSTIC | 91~110 |
| | LEFT LEG PROGNOSTIC | 111~130 |
| (IV) "NO BB HIT + HARITE REACH" | DRAGONFLY PROGNOSTIC | 81~90 |
| | FIGHTING PROGNOSTIC | 91~95 |
| | RIGHT LEG PROGNOSTIC | 96~110 |
| | LEFT LEG PROGNOSTIC | 111~139 |
| (IV) "NO BB HIT + NO REACH" | DRAGONFLY PROGNOSTIC | 91~95 |
| | FIGHTING PROGNOSTIC | 96~100 |

FIG. 38

APPEARANCE PROBABILITY TABLE

| RESULT OF INTERNAL ELECTION | "REACH" DEMO. | (a) | (b) | (c) | (d) | (e) |
|---|---|---|---|---|---|---|
| "BB HIT" APPEARANCE PROBABILITY =1/256 | "CLAPPING REACH" APPEARANCE PROBABILITY =25/140 | A | A | 12/40 | 300/1433600 | 0.021% |
| | | | B | 2/40 | 50/1433600 | 0.003% |
| | | | C | 4/40 | 100/1433600 | 0.007% |
| | | | D | 0 | 0/1433600 | 0% |
| | | B | A | 2/40 | 50/1433600 | 0.003% |
| | | | B | 9/40 | 225/1433600 | 0.016% |
| | | | C | 2/40 | 50/1433600 | 0.003% |
| | | | D | 1/40 | 25/1433600 | 0.002% |
| | | C | A | 4/40 | 100/1433600 | 0.007% |
| | | | B | 1/40 | 25/1433600 | 0.002% |
| | | | C | 0 | 0/1433600 | 0% |
| | | | D | 0 | 0/1433600 | 0% |
| | | D | A | 0 | 0/1433600 | 0% |
| | | | B | 0 | 0/1433600 | 0% |
| | | | C | 1/40 | 25/1433600 | 0.002% |
| | | | D | 2/40 | 50/1433600 | 0.003% |
| | "HARITE REACH" APPEARANCE PROBABILITY =40/140 | A | A | 2/40 | 80/1433600 | 0.006% |
| | | | B | 3/40 | 120/1433600 | 0.008% |
| | | | C | 4/40 | 160/1433600 | 0.011% |
| | | | D | 1/40 | 40/1433600 | 0.003% |
| | | B | A | 9/40 | 360/1433600 | 0.025% |
| | | | B | 0 | 0/1433600 | 0% |
| | | | C | 2/40 | 80/1433600 | 0.006% |
| | | | D | 2/40 | 80/1433600 | 0.006% |
| | | C | A | 2/40 | 80/1433600 | 0.006% |
| | | | B | 6/40 | 240/1433600 | 0.017% |
| | | | C | 2/40 | 80/1433600 | 0.006% |
| | | | D | 1/40 | 40/1433600 | 0.003% |
| | | D | A | 1/40 | 40/1433600 | 0.003% |
| | | | B | 1/40 | 40/1433600 | 0.003% |
| | | | C | 2/40 | 80/1433600 | 0.006% |
| | | | D | 2/40 | 80/1433600 | 0.006% |
| | "ALL ROTATION REACH" APPEARANCE PROBABILITY =75/140 | A | A | 15/40 | 1125/1433600 | 0.078% |
| | | | B | 3/40 | 225/1433600 | 0.016% |
| | | | C | 0 | 0/1433600 | 0% |
| | | | D | 1/40 | 75/1433600 | 0.005% |
| | | B | A | 1/40 | 75/1433600 | 0.005% |
| | | | B | 12/40 | 900/1433600 | 0.063% |
| | | | C | 0 | 0/1433600 | 0% |
| | | | D | 0 | 0/1433600 | 0% |
| | | C | A | 8/40 | 600/1433600 | 0.042% |
| | | | B | 0 | 0/1433600 | 0% |
| | | | C | 0 | 0/1433600 | 0% |
| | | | D | 0 | 0/1433600 | 0% |
| | | D | A | 0 | 0/1433600 | 0% |
| | | | B | 0 | 0/1433600 | 0% |
| | | | C | 0 | 0/1433600 | 0% |
| | | | D | 0 | 0/1433600 | 0% |

(a) FACE PROGNOSTIC 1 (b) FACE PROGNOSTIC 2 (c) RATE OF APPEARANCE
(d) PROBABILITY DATA (e) APPEARANCE PROBABILITY

FIG. 39

APPEARANCE PROBABILITY TABLE

| RESULT OF INTERNAL ELECTION | "REACH" DEMO. | (a) | (b) | (c) | (d) | (e) |
|---|---|---|---|---|---|---|
| "NO BB HIT" APPEARANCE PROBABILITY =255/256 | "CLAPPING REACH" APPEARANCE PROBABILITY =5/140 | A | A | 2/40 | 2550/1433600 | 0.18% |
| | | | B | 3/40 | 3825/1433600 | 0.27% |
| | | | C | 4/40 | 5100/1433600 | 0.36% |
| | | | D | 1/40 | 1275/1433600 | 0.09% |
| | | B | A | 2/40 | 2550/1433600 | 0.18% |
| | | | B | 4/40 | 5100/1433600 | 0.36% |
| | | | C | 1/40 | 1275/1433600 | 0.09% |
| | | | D | 0 | 0/1433600 | 0% |
| | | C | A | 0 | 0/1433600 | 0% |
| | | | B | 4/40 | 5100/1433600 | 0.36% |
| | | | C | 13/40 | 16575/1433600 | 11.60% |
| | | | D | 1/40 | 1275/1433600 | 0.09% |
| | | D | A | 1/40 | 1275/1433600 | 0.90% |
| | | | B | 1/40 | 1275/1433600 | 0.09% |
| | | | C | 3/40 | 3825/1433600 | 0.27% |
| | | | D | 0 | 0/1433600 | 0% |
| | "HARITE REACH" APPEARANCE PROBABILITY =4/140 | A | A | 0 | 0/1433600 | 0% |
| | | | B | 8/40 | 8160/1433600 | 0.60% |
| | | | C | 2/40 | 2040/1433600 | 0.14% |
| | | | D | 0 | 0/1433600 | 0% |
| | | B | A | 8/40 | 8160/1433600 | 0.60% |
| | | | B | 0 | 0/1433600 | 0% |
| | | | C | 0 | 0/1433600 | 0% |
| | | | D | 3/40 | 3060/1433600 | 0.21% |
| | | C | A | 0 | 0/1433600 | 0% |
| | | | B | 3/40 | 3060/1433600 | 0.21% |
| | | | C | 3/40 | 3060/1433600 | 0.21% |
| | | | D | 2/40 | 2040/1433600 | 0.14% |
| | | D | A | 2/40 | 2040/1433600 | 0.14% |
| | | | B | 4/40 | 4080/1433600 | 0.28% |
| | | | C | 0 | 0/1433600 | 0% |
| | | | D | 5/40 | 5100/1433600 | 0.36% |
| | NO "REACH" APPEARANCE PROBABILITY =131/140 | A | A | 0 | 0/1433600 | 0% |
| | | | B | 0 | 0/1433600 | 0% |
| | | | C | 2/40 | 66810/1433600 | 4.66% |
| | | | D | 2/40 | 66810/1433600 | 4.66% |
| | | B | A | 1/40 | 33405/1433600 | 2.33% |
| | | | B | 0 | 0/1433600 | 0% |
| | | | C | 2/40 | 66810/1433600 | 4.66% |
| | | | D | 2/40 | 66810/1433600 | 4.66% |
| | | C | A | 1/40 | 33405/1433600 | 2.33% |
| | | | B | 1/40 | 33405/1433600 | 2.33% |
| | | | C | 3/40 | 100215/1433600 | 6.99% |
| | | | D | 2/40 | 66810/1433600 | 4.66% |
| | | D | A | 1/40 | 33405/1433600 | 2.33% |
| | | | B | 7/40 | 233835/1433600 | 16.31% |
| | | | C | 3/40 | 100215/1433600 | 6.99% |
| | | | D | 13/40 | 434265/1433600 | 30.29% |

(a) FACE PROGNOSTIC 1 (b) FACE PROGNOSTIC 2 (c) RATE OF APPEARANCE
(d) PROBABILITY DATA (e) APPEARANCE PROBABILITY

FIG. 40

PROBABILITY OF DEVELOPMENT INTO "BB HIT"

| FACE PROGNOSTIC 1 | FACE PROGNOSTIC 2 | ① CASE OF DEVELOPMENT INTO "BB HIT"<br>(I) "BB HIT + CLAPPING REACH"<br>(II) "BB HIT + HARITE REACH"<br>(III) "BB HIT + ALL ROTATION REACH" | ② CASE OF DEVELOPMENT INTO "LOSS"<br>(IV) "LOSS + CLAPPING REACH<br>(V) "LOSS + HARITE REACH"<br>(VI) "LOSS + NO REACH" | PROBABILITY OF DEVELOPMENT<br>①/(①+②) |
|---|---|---|---|---|
| A | A | 1505/1433600 | 2550/1433600 | 37.11% |
| | B | 395/1433600 | 11985/1433600 | 3.19% |
| | C | 260/1433600 | 73950/1433600 | 0.35% |
| | D | 115/1433600 | 68085/1433600 | 0.17% |
| B | A | 485/1433600 | 44115/1433600 | 1.09% |
| | B | 1125/1433600 | 5100/1433600 | 18.07% |
| | C | 130/1433600 | 68085/1433600 | 0.19% |
| | D | 105/1433600 | 69870/1433600 | 0.15% |
| C | A | 780/1433600 | 33405/1433600 | 2.28% |
| | B | 265/1433600 | 41565/1433600 | 0.63% |
| | C | 80/1433600 | 119850/1433600 | 0.07% |
| | D | 40/1433600 | 70125/1433600 | 0.06% |
| D | A | 40/1433600 | 36720/1433600 | 0.11% |
| | B | 40/1433600 | 239190/1433600 | 0.02% |
| | C | 105/1433600 | 104040/1433600 | 0.10% |
| | D | 130/1433600 | 439365/1433600 | 0.03% |

FIG. 41

PROBABILITY OF DEVELOPMENT INTO "REACH"

| FACE PROGNOSTIC 1 | FACE PROGNOSTIC 2 | ① CASE OF DEVELOPMENT INTO "REACH"<br>(I) "BB HIT + CLAPPING REACH"<br>(II) "BB HIT + HARITE REACH"<br>(III) "BB HIT + ALL ROTATION REACH"<br>(IV) "LOSS + CLAPPING REACH<br>(V) "LOSS + HARITE REACH" | ② CASE OF DEVELOPMENT NOT INTO "REACH"<br>(VI) "LOSS + NO REACH" | PROBABILITY OF DEVELOPMENT<br>①/(①+②) |
|---|---|---|---|---|
| A | A | 4055/1433600 | 0 | 100% |
| | B | 12380/1433600 | 0 | 100% |
| | C | 7400/1433600 | 66810/1433600 | 10% |
| | D | 1390/1433600 | 66810/1433600 | 2% |
| B | A | 11195/1433600 | 33405/1433600 | 25% |
| | B | 6225/1433600 | 0 | 100% |
| | C | 1405/1433600 | 66810/1433600 | 2% |
| | D | 3165/1433600 | 66810/1433600 | 5% |
| C | A | 780/1433600 | 33405/1433600 | 2% |
| | B | 8425/1433600 | 33405/1433600 | 20% |
| | C | 19715/1433600 | 100215/1433600 | 16% |
| | D | 3355/1433600 | 66810/1433600 | 5% |
| D | A | 3355/1433600 | 33405/1433600 | 9% |
| | B | 5395/1433600 | 233835/1433600 | 2% |
| | C | 3930/1433600 | 100215/1433600 | 4% |
| | D | 5230/1433600 | 434265/1433600 | 1% |

FIG. 44

(I) "BB HIT + CLAPPING REACH"

| FACE PROGNOSTIC 1 | FACE PROGNOSTIC 2 | RANDOM NUMBER FOR DETERMINATION OF FACE PROGNOSTIC COMBINATION |
|---|---|---|
| A | A | 0 |
| | | 1 |
| | | 2 |
| | | 3 |
| | | 4 |
| | | 5 |
| | | 6 |
| | | 7 |
| | | 8 |
| | | 9 |
| | | 10 |
| | | 11 |
| | B | 12 |
| | | 13 |
| | C | 14 |
| | | 15 |
| | | 16 |
| | | 17 |
| B | A | 18 |
| | | 19 |
| | B | 20 |
| | | 21 |
| | | 22 |
| | | 23 |
| | | 24 |
| | | 25 |
| | | 26 |
| | | 27 |
| | | 28 |
| | C | 29 |
| | | 30 |
| | D | 31 |
| C | A | 32 |
| | | 33 |
| | | 34 |
| | | 35 |
| | B | 36 |
| D | C | 37 |
| | D | 38 |
| | | 39 |

FIG. 45

(II) "BB HIT + HARITE REACH"

| FACE PROGNOSTIC 1 | FACE PROGNOSTIC 2 | RANDOM NUMBER FOR DETERMINATION OF FACE PROGNOSTIC COMBINATION |
|---|---|---|
| A | A | 0 |
| | | 1 |
| | B | 2 |
| | | 3 |
| | | 4 |
| | C | 5 |
| | | 6 |
| | | 7 |
| | | 8 |
| | D | 9 |
| B | A | 10 |
| | | 11 |
| | | 12 |
| | | 13 |
| | | 14 |
| | | 15 |
| | | 16 |
| | | 17 |
| | | 18 |
| | C | 19 |
| | | 20 |
| | D | 21 |
| | | 22 |
| C | A | 23 |
| | | 24 |
| | B | 25 |
| | | 26 |
| | | 27 |
| | | 28 |
| | | 29 |
| | | 30 |
| | C | 31 |
| | | 32 |
| | D | 33 |
| D | A | 34 |
| | B | 35 |
| | C | 36 |
| | | 37 |
| | D | 38 |
| | | 39 |

FIG. 46

(III) "BB HIT + ALL ROTATION REACH"

| FACE PROGNOSTIC 1 | FACE PROGNOSTIC 2 | RANDOM NUMBER FOR DETERMINATION OF FACE PROGNOSTIC COMBINATION |
|---|---|---|
| A | A | 0 |
| | | 1 |
| | | 2 |
| | | 3 |
| | | 4 |
| | | 5 |
| | | 6 |
| | | 7 |
| | | 8 |
| | | 9 |
| | | 10 |
| | | 11 |
| | | 12 |
| | | 13 |
| | | 14 |
| | B | 15 |
| | | 16 |
| | | 17 |
| | D | 18 |
| B | A | 19 |
| | B | 20 |
| | | 21 |
| | | 22 |
| | | 23 |
| | | 24 |
| | | 25 |
| | | 26 |
| | | 27 |
| | | 28 |
| | | 29 |
| | | 30 |
| | | 31 |
| C | A | 32 |
| | | 33 |
| | | 34 |
| | | 35 |
| | | 36 |
| | | 37 |
| | | 38 |
| | | 39 |

FIG. 47

(IV) "NO BB HIT + CLAPPING REACH"

| FACE PROGNOSTIC 1 | FACE PROGNOSTIC 2 | RANDOM NUMBER FOR DETERMINATION OF FACE PROGNOSTIC COMBINATION |
|---|---|---|
| A | A | 0 |
| | | 1 |
| | B | 2 |
| | | 3 |
| | | 4 |
| | C | 5 |
| | | 6 |
| | | 7 |
| | | 8 |
| | D | 9 |
| B | A | 10 |
| | | 11 |
| | B | 12 |
| | | 13 |
| | | 14 |
| | | 15 |
| | C | 16 |
| C | B | 17 |
| | | 18 |
| | | 19 |
| | | 20 |
| | C | 21 |
| | | 22 |
| | | 23 |
| | | 24 |
| | | 25 |
| | | 26 |
| | | 27 |
| | | 28 |
| | | 29 |
| | | 30 |
| | | 31 |
| | | 32 |
| | | 33 |
| | D | 34 |
| D | A | 35 |
| | B | 36 |
| | C | 37 |
| | | 38 |
| | | 39 |

FIG. 48

(V) "NO BB HIT + HARITE REACH"

| FACE PROGNOSTIC 1 | FACE PROGNOSTIC 2 | RANDOM NUMBER FOR DETERMINATION OF FACE PROGNOSTIC COMBINATION |
|---|---|---|
| A | B | 0 |
| | | 1 |
| | | 2 |
| | | 3 |
| | | 4 |
| | | 5 |
| | | 6 |
| | | 7 |
| | C | 8 |
| | | 9 |
| B | A | 10 |
| | | 11 |
| | | 12 |
| | | 13 |
| | | 14 |
| | | 15 |
| | | 16 |
| | | 17 |
| | D | 18 |
| | | 19 |
| | | 20 |
| C | B | 21 |
| | | 22 |
| | | 23 |
| | C | 24 |
| | | 25 |
| | | 26 |
| | D | 27 |
| | | 28 |
| D | A | 29 |
| | | 30 |
| | B | 31 |
| | | 32 |
| | | 33 |
| | | 34 |
| | D | 35 |
| | | 36 |
| | | 37 |
| | | 38 |
| | | 39 |

FIG. 49

(VI) "NO BB HIT + NO REACH"

| FACE PROGNOSTIC 1 | FACE PROGNOSTIC 2 | RANDOM NUMBER FOR DETERMINATION OF FACE PROGNOSTIC COMBINATION |
|---|---|---|
| A | C | 0 |
| | | 1 |
| | D | 2 |
| | | 3 |
| B | A | 4 |
| | C | 5 |
| | | 6 |
| | D | 7 |
| | | 8 |
| C | A | 9 |
| | B | 10 |
| | C | 11 |
| | | 12 |
| | | 13 |
| | D | 14 |
| | | 15 |
| D | A | 16 |
| | | 17 |
| | B | 18 |
| | | 19 |
| | | 20 |
| | | 21 |
| | | 22 |
| | | 23 |
| | C | 24 |
| | | 25 |
| | | 26 |
| | D | 27 |
| | | 28 |
| | | 29 |
| | | 30 |
| | | 31 |
| | | 32 |
| | | 33 |
| | | 34 |
| | | 35 |
| | | 36 |
| | | 37 |
| | | 38 |
| | | 39 |

FIG. 50
FACE SYMBOL DETERMINATION TABLE
| PROGNOSTIC GROUP | RANDOM NUMBER FOR DETERMINATION OF PROGNOSTIC DISPLAY COMBINATION | |
|---|---|---|
| | CASE OF EVEN RANDOM NUMBER | CASE OF ODD RANDOM NUMBER |
| A GROUP | FACE SYMBOL 1  | FACE SYMBOL 2  |
| B GROUP | FACE SYMBOL 3  | FACE SYMBOL 4  |
| C GROUP | FACE SYMBOL 5  | FACE SYMBOL 6  |
| D GROUP | FACE SYMBOL 7  | FACE SYMBOL 8  |

"CLAPPING REACH"

"HARITE REACH"

FACE PROGNOSTIC 1

FACE PROGNOSTIC 2

DRAGONFLY PROGNOSTIC

FIGHTING PROGNOSTIC

BEAR PROGNOSTIC

RIGHT LEG LIFTING PROGNOSTIC

LEFT LEG LIFTING PROGNOSTIC

SMALL DEGREE LEG LIFTING

GAMING MACHINE

BACKGROUND OF THE INVENTION

1. Field of the Invention

The present invention relates to a gaming machine that is provided with a symbol display arrangement for variably displaying a plurality of symbols necessary for a game and a controller such as a microcomputer for controlling the variable display of the symbol display arrangement. More specifically, the invention relates to a slot machine having buttons for a player to manipulate for stopping variation action of the variable display in desired timing (hereinafter referred to as "Pachi-Slo" machine).

2. Description of the Related Art

Two types of the Pachi-Slo machines are commercially used. One type of Pachi-Slo machine has mechanical reels for variably displaying the symbols (special symbols) relevant direct to profit of a player, and if desired, also has an electrical display device as secondary display for performing a demonstration display such as a prognostic display or a "reach action." Another type of the Pachi-Slo machine has an electrical display device for variably displaying the special symbols and for performing the demonstration display, which is called a "video slot machine."

Such electrical displays permit various indications or demonstrations that enhance the player's interest in the game. For example, such indications may include: a change in a background color to indicate in an exciting way that a specified combination of the special symbols corresponds to a special win, e.g., "big hit" or "Big Bonus hit" (hereinafter termed "BB hit"); the appearance of a new character other than the special symbols; an indication of a pattern with unusual motion to indicate that the special win can be obtained if one more special symbol is arranged in the display (i.e., "reach state"), thereby indicating to the player that a special win may soon appear; etc.

When the reach action begins, the player's attention is drawn to the display with an expectation of the appearance of the special win. The reach action includes, for example, a change in the speed of the displayed pattern or symbol variation, a change of the duration of the symbol variation, or the like. Sometimes, the special win will appear 100% of the time after a special reach action. Thus, such a reach action is predictive of the appearance of the special win.

The reach action on a display of a conventional Pachi-Slo machine, however, may disadvantageously be but a simple indication, such as a change of speed or duration of a particular pattern or symbol variation. Since the special win might not always appear, the conventional simple indication may betray the players expectation and thereby have the contrary effect of reducing the player's interest in the game.

In addition, as mentioned above, it is known that the reach action is carried out by indicating a symbol or a character other than the special symbols. The conventional reach action is but a simple symbol indication, and does not provide any information as to the possibility of the appearance of the special win. The player therefore easily tires of the conventional simple reach action, and the game becomes monotonous.

Some conventional Pachi-Slo machines are arranged to generate a plurality kinds of sounds when the game has started by player operation. Among the plurality kinds of sounds, at least one kind of the sound is predetermined to be frequently generated in the general game state where a special win such as "BB hit" has not been elected by a lottery of the internal system and at least one kind of the sound other than the above is predetermined to be generated frequently when the special rank of win is elected by a lottery of the internal system. Thus, the Pachi-Slo machines can predict the appearance of the special win by the generated sounds. Further some conventional Pachi-Slo machines are arranged to switch on back lamps disposed behind the reels in a predetermined way or sequence or flashing them in a predetermined pattern. The Pachi-Slo machines can predict the appearance of the special win by the operation of back lamps at a constant probability when the special win is elected by the lottery of the internal system. Further some conventional Pachi-Slo machines are arranged to predict the special win by the generation of the sounds or the operation of the back lamps, or a combination thereof. However, such simple generation of sounds or operation of back lamps cannot give the player a detailed prediction.

Reliable information relative to the appearance of a special win, "big hit" or a "BB hit" will not give the player excessive expectation of a "big hit" or a "BB hit" and the player will not feel betrayed when a "loss" is definitely determined. If the information indicative of the probability of a "big hit" is not only simple information, but also an interesting and effective demonstration with variety, it would enhance the player's interest in the entire game.

SUMMARY OF THE INVENTION

An object of the present invention is to provide a Pachi-Slo machine which can display a likelihood or a reliability of appearance of a special win such as "big hit" or "BB hit," etc. and an interesting and effective demonstration with variety.

A gaming machine according to the present invention has:

- a symbol display arrangement for variably displaying a plurality of symbols that is arranged to display a stop state when the variation of displayed symbols is stopped and to give a profit to a player when the stop state corresponds to a specific stop state;
- a predictive display arrangement for performing a predictive display whether or not the specific stop state is displayed when the variation of the displayed symbols is stopped;
- a start device for starting the variation of the displayed symbols in response to manipulation by a player;
- a stop device for stopping the variation of the displayed symbols in response to manipulation by a player; and
- a controller for determining whether or not it is permitted to display the specific stop state and for determining a predictive display mode based on the result of the determination, the controller being arranged to control the predictive display arrangement such that a likelihood of appearance of the specific stop state is changeable in conjunction with a change in the game resulting from passage of time.

In the Pachi-Slo machine according to the invention, the likelihood of appearance of a specific stop state is varied with the passage of time, and the player can adjust his or her stop manipulation in response to the confirming changes of the predictive display, which are themselves responsive to the expectation of the appearance of a predictive display of "XXX" at the time of the player's manipulation. In addition, since the predictive display employs symbols, the player can recognize the information relating to the prediction precisely, and a varying, effective demonstration can be realized, thereby enhancing the fun of the game.

In one embodiment of the present invention, there is provided a gaming machine in which the likelihood of the appearance of the specific stop state is changeable by displaying a plurality of predictive display symbols sequentially with the passage of time. Thus, the player easily can recognize the time-dependent change of the likelihood of appearance of the specific stop state.

According to another embodiment of the present invention, there is provided a gaming machine in which the plurality of the predictive display symbols are displayed successively. Accordingly, smaller changes in the likelihood of predicting the appearance of the specific stop state can be indicated to the player by the successively displayed symbols.

In a still further embodiment of the present invention, the plurality of the predictive display symbols depicts a story line. The change of the predictive display symbols that accompanies the change of the likelihood is arranged to depict a story line. Accordingly, the player's interest in the predictive display is enhanced, consequently enhancing the player's interest in the entire game.

In another embodiment of the present invention, there is provided a gaming machine in which the controller is provided with a predictive display memory for storing a plurality of predictive display symbol groups, each having the plurality of predictive display symbols, by classifying them in accordance with the likelihood of appearance of the specific stop state. The predictive display can be performed in various display modes, which can correspond to the same degree of probability, so that the player will not easily be tired of the symbol variation from start to stop. Moreover, the player's interest in the game is enhanced by enabling the player to estimate the quantum of the likelihood that is associated with the displayed predictive display.

In accordance with yet another embodiment of the present invention, there is provided a gaming machine in which the likelihood of appearance of the specific stop state is changeable in response to the stop timing of the variation of the symbols being displayed by the symbol display arrangement. The likelihood or reliability of appearance of the specific stop state is changeable in response to the stop timing of the variation action of the symbols being displayed by the symbol display arrangement. Accordingly, a sense of relationship between the stop display and the predictive display can be imparted to a player. The player easily recognizes the predictive display by paying attention to the stop display of the variation action.

The player who is aware of the relationship between the stop timing of the variation of the displayed symbols and the timing of the change of the likelihood, will pay attention to what is displayed in each timing. Accordingly, an effect is produced that increases the player's expectation of the special win in response to the stop timing of the variations of displayed symbols.

In accordance with another embodiment of the present invention, there is provided a gaming machine in which the predictive display is performed one or more times until the variation of any one of the variably displayed symbols is stopped.

In the case where the predictive display predicts the appearance of the specific stop state, the procedure of the game is arranged in the order of "start of all symbol variations"→"predictive display"→"stop of one of the symbol variations." The player may have an expectation as to whether the predictive display will lead to a special win.

In particular, in the case where three variable symbols are displayed and the variations of the three variable symbols are arranged to stop at different times, the second stop symbol is used to determine whether or not the "reach state" is established, and therefore the player is concerned about the second stop symbol. In the present invention, the likelihood or reliability indicated by the predictive display may sometimes include two kinds: first, the probability of development into a special win such as, for example, "big hit" or "BB hit," depending upon whether or not the specific stop state will appear; and second, the probability of development into a "reach state."

In accordance with yet another embodiment of the present invention, there is provided a gaming machine in which the predictive display is performed one or more times during a period beginning when the variation of any one of the variably displayed symbols is stopped to the time that the variation of a further one of the variably displayed symbols is stopped.

In the case where the predictive display predicts the appearance of a "reach state," if the procedure of the game is arranged in the order of "start of all symbol variations"→"stop of a first one of the symbol variations"→"predictive display"→"stop of a second one of the symbol variations," a player can understand a process in which the player is advised of whether or not a "reach state" is actually established after the player doubted whether the predictive display would be connected to the "reach state," thereby increasing the player's interest in finding a relationship between the predictive display and the development into the "reach state." In other words, the player will seek the kind of predictive display that needs to be executed to develop the game into the "reach state." In addition, if a player recognizes the predictive display that tends to develop into the "reach state," then the player will pay attention to the subsequent course of the game with an expectation that the possibility of development into a "reach state" will be high because the particular predictive display was executed. This expectation is established to a predetermined certainty, and hence the player's interest in the game is enhanced.

In accordance with another embodiment, there is provided a gaming machine in which the predictive display is performed one or more times during a period beginning when variations of any two of the variably displayed symbols are stopped to the time when variation of a further one of the variably displayed symbol is stopped.

In the case where three variable symbols are arranged to be displayed and two symbols among them have already stopped to establish a "reach state," the third (last) stop symbol fills the role of determining whether or not the specific stop state is established. By executing a predictive display to indicate the likelihood of development into a special win during a "reach state," the player's interest is increased by finding a relation between the predictive display and the development into the "reach state." When a known predictive display is performed, the player will pay attention to the game with an expectation that is supported by a predetermined certainty in the appearance of the specific stop state.

In accordance with still another embodiment, there is provided a gaming machine in which the predictive display is performed one or more times until the variation of any one of the variably displayed symbols is stopped and then one or more times until variation of further one of the variably displayed symbols is stopped subsequently.

In accordance with another embodiment, there is provided a gaming machine in which the predictive display is arranged to be performed one or more times until the variation of any one of the variably displayed symbols is stopped and then one or more times during a period beginning at a time when the variation of further one of the variably displayed symbols is stopped to the time when the variation of further one of the variably displayed symbols is stopped subsequently.

In another embodiment, there is provided a gaming machine in which the predictive display is performed one or more times during a period beginning at a time when the variation of any one of the symbols is stopped to the time when the variation of further one of the variably displayed symbols is stopped, and then one or more times until variation of further one of the variably displayed symbols is stopped subsequently.

In accordance another embodiment, there is provided a gaming machine in which the predictive display is performed one or more times until the variation action of any one of the variably displayed symbols is stopped, then a further one or more times until the variation of a further one of the variably displayed symbols is stopped, and then a further one or more times until the variation of a further one of the variably displayed symbols is stopped.

One of gaming machines according to the present invention has a display screen for performing both, the variable display of symbols and the predictive display. A player can have an enhanced sense of unity in the variably displayed symbols and the predictive display, and an increased interest of the game. Further, a player can watch the display screen at a glance with little movement and can easily understand a change of the game state.

A further gaming machine according to the present invention has:

a plurality of mechanical rotatable reels each provided with a plurality of symbols that are arranged to display a stop state when their rotations are stopped and to give a profit to a player when the stop state corresponds to a specific stop state;

a random number generator for generating a random number;

a start device for extracting the random number and starting the rotations of the reels in response to a manipulation by a player;

stop devices for stopping respective rotations of the reels in response to each manipulation by the player;

an electrical display arrangement for performing predictive display whether or not the specific stop state is displayed when the rotations of the reels are stopped; and a controller for determining whether or not it is permitted to display the specific stop state and for determining a predictive display mode based on the result of said determination, the controller being arranged to control the predictive display arrangement such that a likelihood of appearance of the specific stop state is changeable in conjunction with a change in the game resulting from the passage of time.

In accordance with this type of "Pachi-Slo" machine, since the predictive display is performed by the electrical display arrangement and the variable display of the symbols is performed by the mechanical reels, a player will execute stop manipulation of the reels, e.g., push button operation while watching the symbols on the reels, thereby a bad influence for eyes due to continuous gaze of the electrical display screen for a long time can be restrained. Further, the electrical display arrangement can give various visual demonstrations using predictive symbols to enhance the interest of the game.

BRIEF DESCRIPTION OF THE DRAWINGS

Comprehension of the invention is facilitated by reading the following detailed description, in conjunction with the annexed drawing, in which:

FIG. 2 is a table for determination of "prognostic facial expression;"

FIG. 4 is a table of results of winning for combinations of winning symbols when three reels are stopped;

FIG. 11 is a table showing ranges of random numbers to be extracted;

FIG. 12 is a table for the determination of "winning rank" correlated to random numbers;

FIG. 13 is a table for the determination of each permission correlated to random numbers;

FIG. 14 is a table for the determination of "reach demonstration" for BB hit correlated to random numbers;

FIG. 15 is a table for the determination of "reach demonstration" for "no BB hit" correlated to random number ranges;

FIG. 37 is "table B for the prognostic display determination" correlated to random number ranges;

FIG. 38 is a table showing an appearance probability for a "BB hit" when the determination results in the "BB hit;"

FIG. 39 is a table showing an appearance probability for a "no BB hit" when the determination results in "no BB hit;"

FIG. 40 is a tabular representation that illustrates the probability of development into a "BB hit;"

FIG. 41 is a tabular representation that illustrates the probability of development into "reach;"

FIG. 44 is a tabular representation for the determination of a prognostic facial expression combination to be referred to in the event of the "BB hit"+"clapping reach;"

FIG. 45 is a tabular representation for the determination of a prognostic facial expression combination to be referred to in the event of the "BB hit"+"harite reach;"

FIG. 46 is a tabular representation for the determination of a prognostic facial expression combination to be referred to in the event of the "BB hit"+"all rotation reach;"

FIG. 47 is a tabular representation for the determination of a prognostic facial expression combination to be referred to in the event of the "no BB hit"+"clapping reach;"

FIG. 48 is a tabular representation for the determination of a prognostic facial expression combination to be referred to in the event of the "no BB hit"+"harite reach;"

FIG. 49 is a tabular representation for the determination of a prognostic facial expression combination to be referred to in the event of the "no BB hit"+"no reach;"

FIG. 50 is a tabular representation for the determination of facial expression symbol;

DETAILED DESCRIPTION

A Pachi-Slo machine that is an embodiment of the present invention will be explained in detail below.

Figure 1:
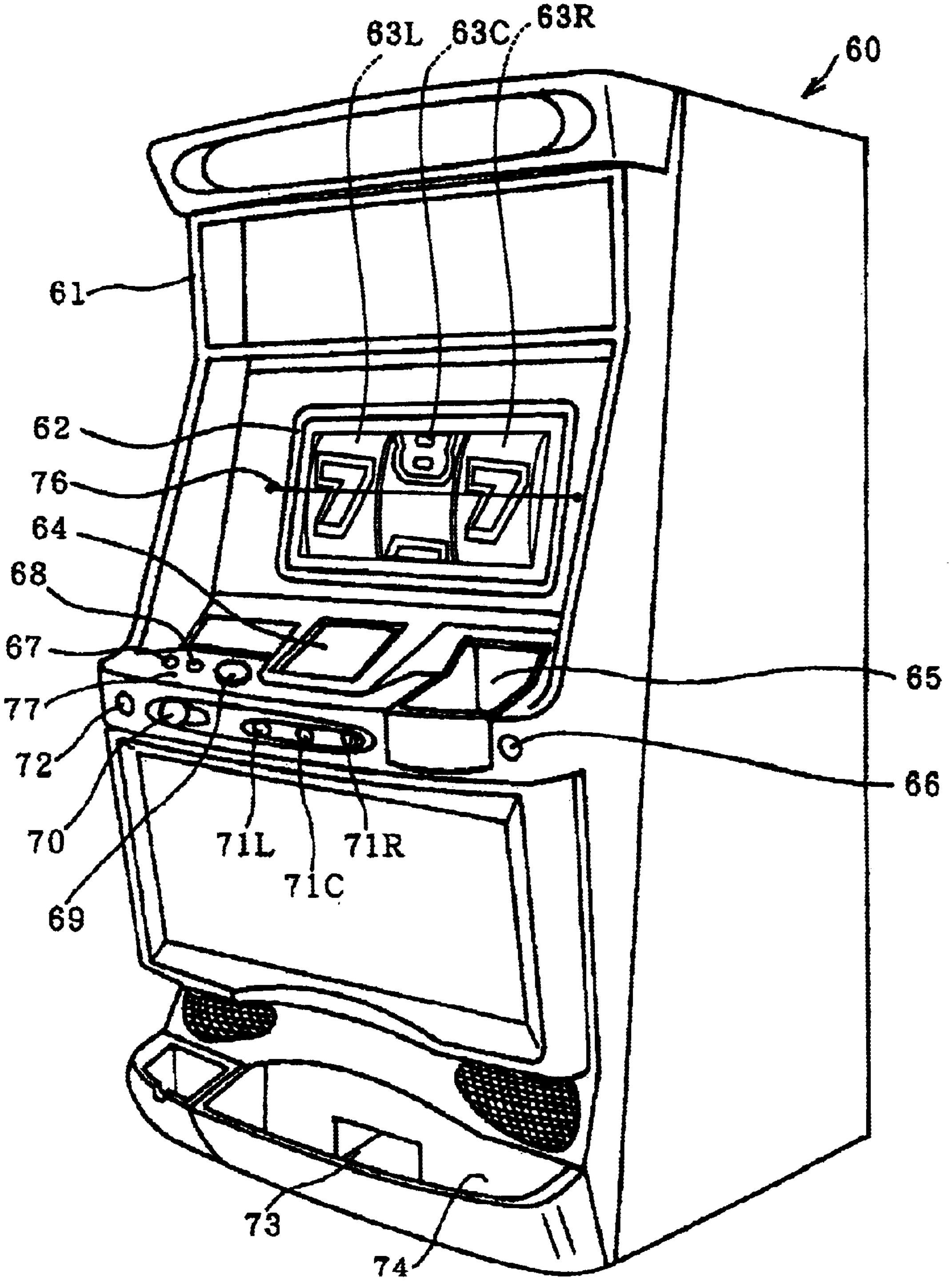
FIG. 1 is a representation of a specific illustrative embodiment of the present invention in the form of a Pachi-Slo machine.

FIG. 1 is a perspective representation showing the outer appearance of a Pachi-Slo machine 60. Pachi-Slo machine 60 has three mechanical rotatable reels 63L, 63C, 63R that function as a symbol display arrangement, and a liquid crystal display screen 64 that functions as a predictive display arrangement. Pachi-Slo machine 60 is a gaming machine played by using a coin, a medal or a token as a game medium (not shown). Hereinafter, the game medium will be referred to as "coin."

In the front of a cabinet 61 of Pachi-Slo machine 60, a rectangular display window 62 is provided having a substantially perpendicular surface. A horizontal winning line 76 is provided on display window 62.

Reels 63L, 63C, 63R are arranged side-by-side in cabinet 61. A plurality of symbols are arranged on peripheral surfaces of reels 63L, 63C, 63R, respectively. The symbols of each reel 63L, 63C, 63R can be observed through display window 62.

A pedestal portion 77 having a substantially horizontal surface is formed at position lower than display window 62 of cabinet 61. The liquid crystal display screen 64 is arranged to have a slant surface in the center of pedestal portion 77. Liquid crystal display screen 64 is arranged to perform a predictive display for predicting an appearance of a "Big Bonus" win (hereinafter termed "BB hit") that is an example of the specific stop state where a player can obtain big profits. There are two kinds of predictive displays, as follows:

A first kind of predictive display is performed during a "reach state" wherein rotations of any two reels among the three reels are stopped to display the same special symbols. This predictive display is referred to as a "reach demonstration" that reflects a likelihood or reliability of appearance of the "BB hit." It should be noted, however, that the present invention also includes within its scope an embodiment in which "reach demonstration" is not displayed.

The second kind of the predictive display is performed during a period from the start of the rotations of the three reels to the time of establishment of the "reach state." This predictive display is referred to as "prognostic display" that reflects a likelihood or reliability of appearance of the "BB hit" via the "reach state."

There is shown in FIG. 1 a bucket-type coin inlet 65 on the right side of the liquid crystal display 64 in which a large quantity of coins (not shown) can be held.

In the left side of the pedestal portion 77, there are a "1-BET" switch 67 for betting only one of credited coins for a game, a "2-BET" switch 68 for betting two of credited coins for a game, and a "Max-BET" switch 69 for betting possible maximum number of credited coins for a game through a manipulation of push button.

A start lever 70 is provided turnably within a predetermined range of angle in the left side of front of pedestal portion 77. If a player operates start lever 70, then reels 63L, 63C, 63R turn and start movement of symbols appearing in display window 62.

In the center of front of pedestal portion 77, for stopping the symbols moving along three rows in display window 62, three stop buttons 71L, 71C, 71R that a player operates are disposed in the lower side of liquid crystal display 64.

A switch 66 for automatically supplying coins to a credit portion (not shown) is provided on the right position of front pedestal portion 77. When coins exceeding the possible number of credit are into coin inlet 65 and switch 66 is operated, the coins in the bucket of coin inlet 65 are credited automatically so that the number of credited coins can be maintained not less than a predetermined number.

In the left side of start lever 70, there is a C/P switch 72 for changing credit or pay-out of coins that a player obtained in a game by push button manipulation. If C/P switch 72 is operated, then coins are paid from a coin outlet 73 of the front lower portion and are collected in a coin tray 74.

Figure 3:
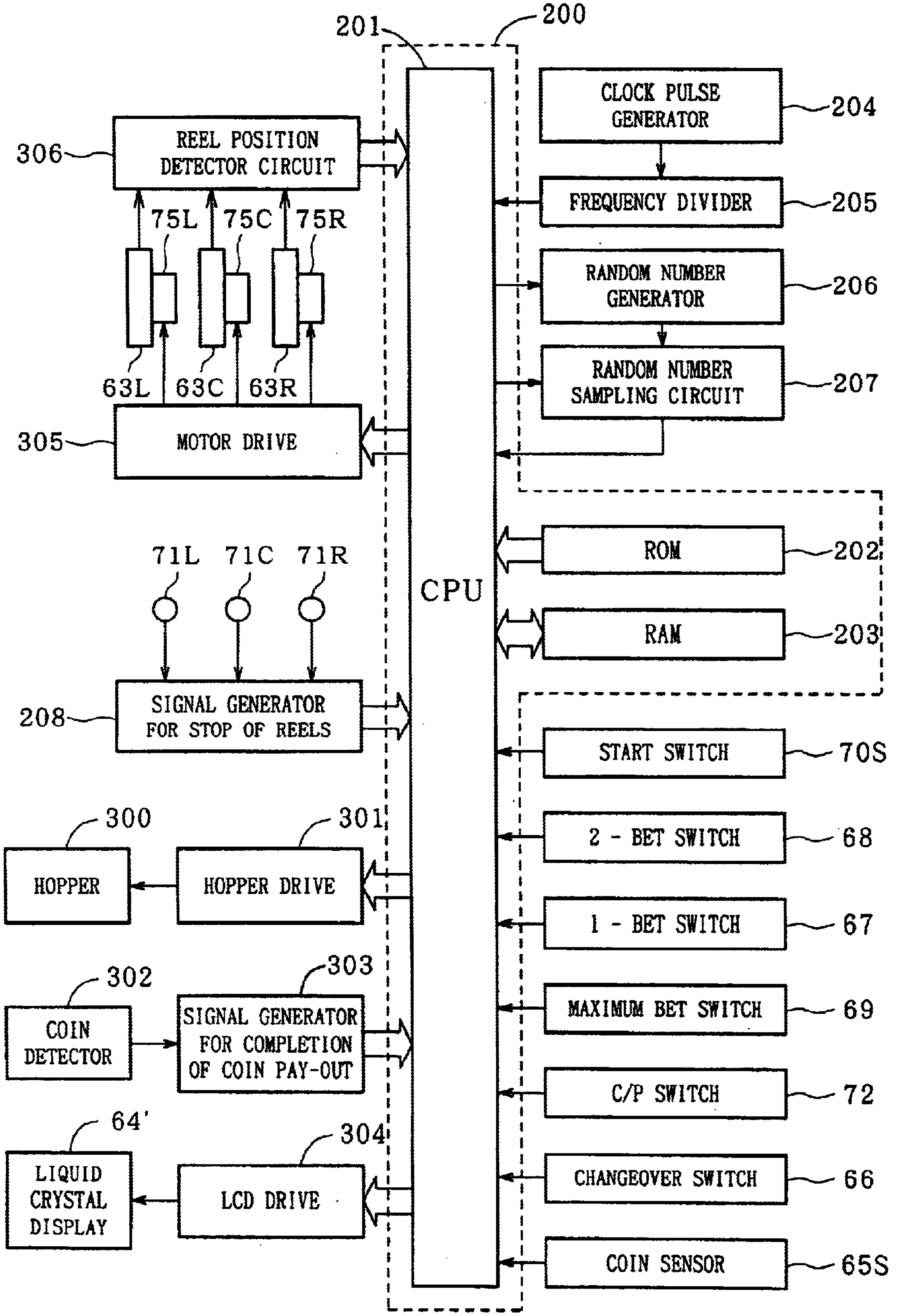
FIG. 3 is a block diagram of circuit of the Pachi-Slo machine.

On each reel 63L, 63C a plurality of symbols (in the example, numeral patterns "1" to "9") are arranged to constitute a symbol row. Code numbers are referred to the symbols, respectively, and are stored as data table in ROM 202 (FIG. 3).

The prognostic display in Pachi-Slo machine 60 is a display for predicting that a combination of symbols will be "7-7-7" to indicate "BB hit" if reels 63L to 63R are stopped after "reach state." As for predictive display in this machine 60, the predictive display mode can be changed with passage of time, and also the likelihood of "BB hit" by predictive display (likelihood of appearance of "BB hit" indicated by prediction that "BB win" will come) varies with change of the predictive display mode. For example, during rotation of reels 63L to 63R, liquid crystal display 64 indicates one of face symbols "1" to "8" of FIG. 2 and changes the displayed face symbol with passage of time such that ace symbol 1 is displayed when the first stop manipulation is performed by a player and "face symbol 2" is displayed when the second stop manipulation is performed by a player.

More specifically, after reels 63L to 63 R start to rotate, any face symbol is displayed and the face symbol changes its pattern, i.e., display state with passage of time. In other words, the change of display state of the face symbol shows that the likelihood of "BB hit" changes. Accordingly, a combination of a plurality of different face symbols can make the likelihood of "BB hit" increased, decreased, or increased and decreased in turn with passage of time. Also, it may always display the face symbol with no relation to the rotation of reels 63L to 63R. If a normal pattern is "K1" and the prognostic display patterns are "K2" and "K3," then the display pattern of the face symbol can change with passage of time such as K1→K2→K3→K1, or K1→K2→K1→K3→K1.

Figure 17:
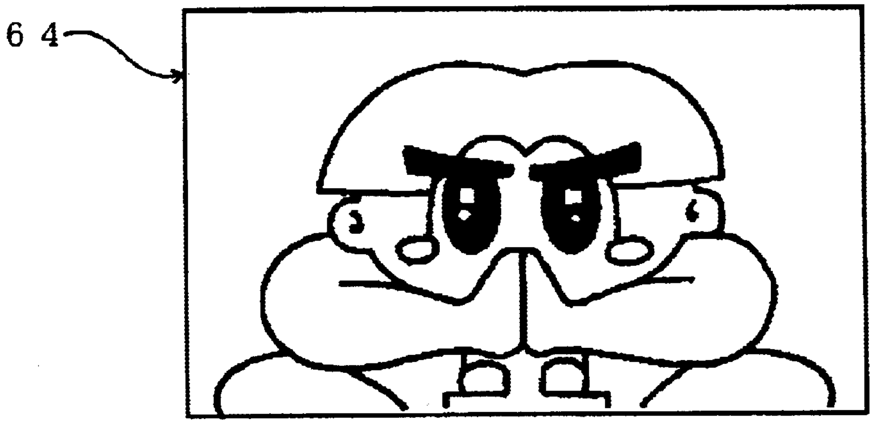
FIG. 17 is a representation that illustrates a display of "clapping reach;"
Figure 18:
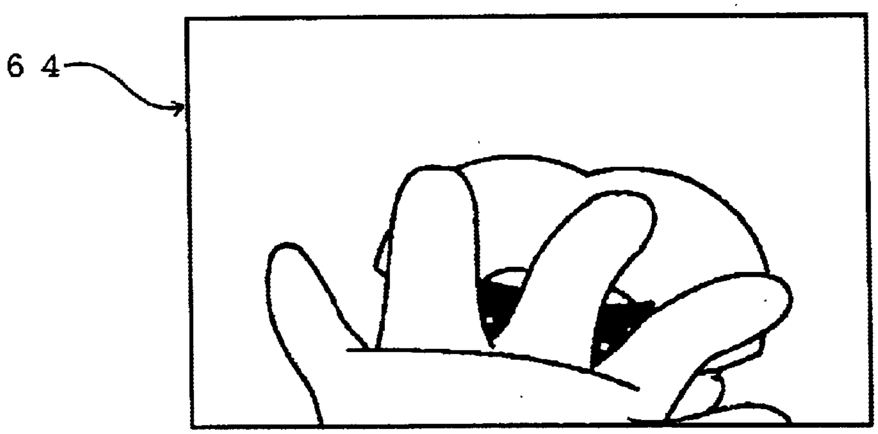
FIG. 18 is a representation that illustrates a display of "harite reach;"

If the stop manipulation is performed by a player in the order of left reel 63L and right reel 63R, and left and right reels 63L and 63R that are stopped display the same symbols indicating "reach state," then liquid crystal display 64 indicates "reach demonstration" by various kinds of picture expression. Specifically, "reach demonstration" such as "clapping reach" or "harite reach" is performed as shown in FIGS. 17 and 18. Such "reach demonstration" reflects the likelihood of appearance of the special symbol display state.

FIG. 3 shows an electrical circuit construction that includes a controller for controlling game procedure of Pachi-Slo machine 60 shown in FIG. 1 and peripheral devices (actuators) connected to the controller.

The controller has a microcomputer 200 that is a main element and an additional circuit for sampling random number. Microcomputer 200 includes CPU 201 that performs control action according to a stored program, and ROM 202 and RAM 203 that are memories. A clock pulse generator circuit 204 for generating standard clock pulses, a random number generator 206 and a frequency divider 205 for generating random number, and a random number sampling circuit 207 are connected to CPU 201. Otherwise, the random number sampling may be executed in microcomputer 200, namely according to program stored in CPU 201. In that case, random number generator 206 and random number sampling circuit 207 can be omitted or can exist for backup of random number sampling.

ROM 202 of microcomputer 200 has stored information and data that are required for execution of procedure for displaying a plurality of display images in liquid crystal display 64 as will be mentioned later in addition to game control of the Pachi-Slo machine. ROM 202 also stores a plurality of predictive display symbols for the likelihood of "BB hit," for example, a table for "prognostic facial determination" in which a plurality of "Kintaro" symbols are categorized as shown in FIG. 2. The "Kintaro" symbols are categorized into four groups A, B, C, and D that are arranged in order of the likelihood of "BB hit," and each group contains two kinds of "Kintaro" symbols with different facial expression (face symbols). The face symbols to be displayed as the prognostic display (prognostic facial expression) is selected by random number extraction. More specifically, a random number that is used to determine the prognostic facial expression as will be explained later.

In the circuit of FIG. 3, as major actuators to be controlled by control signals from microcomputer 200, there are stepping motors 75L, 75C, 75R that drive rotation reels 63L, 63C, 63R, liquid crystal display device 64' containing liquid crystal display 64, and a hopper (including driver for pay-out) 300 for receiving coins. A motor drive circuit 305, a liquid crystal drive circuit 304 and a hopper drive circuit 301 are connected to output port of CPU 201 through I/O port. These drive circuits each receive control signals such as drive signal output from CPU 201 to control each actuator.

Also, as input signal generating means that generates input signals necessary for microcomputer 200 to generate control signals, there are a coin sensor 65S for detecting coin inserted into a coin inlet 65 or coin supplied from credit by pushing switch 66; a start switch 70S for detecting operation of start lever 70; a C/P switch 72; a reel stop signal circuit 208 for generating stop signals in response to manipulation of stop buttons 71L,71C, 71R; a reel position detecting circuit 306 that receives a pulse signal from reel rotation sensor and supplies signals to detect position of each reel to CPU 201; and a pay-out completion signal circuit 303 that generates signals for detecting completion of coin pay-out when count value of coin detector 302 (number of coins paid out from hopper 300) is reached the predetermined number of coin,. These are connected to CPU 201 through I/O port.

In the circuit of FIG. 3, random number generation device 206 generates random numbers in a range of numerical value. Sampling circuit 207 samples a random number at good timing after start lever 70 is manipulated. Whether or not the random number sampled for determining "winning rank"belongs to a range of random number value in a table for a winning rank determination (FIG. 12) that is stored in ROM 202, determines the "winning rank," and the control signal corresponding to the determined "winning rank" is generated.

After reels 63L to 63R start rotation, the drive pulses that are supplied from stepping motors 75L to 75R are counted and the count value is written in a predetermined area of RAM 203. Reset pulses are produced from reels 63L to 63R per one round. These pulses are input to CPU 201 through the reel position detecting circuit. CPU 201 makes the counted value of drive pulses stored in RAM 203 to be "0" by the reset pulses. Then, count value corresponding to rotational position within one round of each reel 63L, 63C, 63R is stored in RAM 203.

A symbol table is stored in ROM 202, that relates the rotational position of reels 63L to 63R with symbol on the reels. Also, a table of winning symbol combination is stored in ROM 202. In the winning symbol combination table, the combination of winning symbols, number of coin allotted to winning, and winning determination code correspond each other. The winning symbol combination table is referred when reels 63L to 63R are controlled to stop and when winning is confirmed after all reels stop, respectively.

When any winning rank is internally elected by a procedure (termed "internal election") based on the random number sampling as mentioned above, in response to the operation signal that is sent from the reel stop signal circuit 208 when a player manipulates stop buttons 71L, 71C, 71R, CPU 201 sends signals that control reels 63L, 63C, 63R to stop at symbol display positions corresponding to a kind of winning rank elected to motor drive circuit 305, and sends an instruction signal to hopper drive circuit 301 for paying out a predetermined number of coins from hopper 300. At that time, coin detector 302 counts number of coins paid out from hopper 300, and when the value of count is reached to the predetermined number, a coin pay-out completion signal is inputted to CPU 201. Then, CPU 201 stops driving of hopper 300 through hopper drive circuit 301 to finish the coin pay-out procedure.

In the election procedure as mentioned above, it is determined which is elected, the most advantageous "big bonus" ("BB") equivalent to "BB hit," the regular bonus ("RB"), lower rank of winning, replay, or loss. Here, it is termed "internal win" that the winning rank is elected by the election process.

FIG. 4 shows a kind of winning symbols of each reel 63L to 63 R that will bring winning when the reels are stopped. If reels 63L to 63 R are stopped to display "7-7-7" along a winning line 76, then fifteen coins are paid out and "BB" win comes. The "BB" game is a game state that is the most advantageous for a player, in which the player can play three times "RB" game as will be explained next and can obtain many coins by successive election of lower ranks thirty times in maximum. During "BB," neither "BB" nor "RB" are elected.

When "3-3-3" is displayed along winning line 76, fifteen coins are paid out and the "RB" win comes. The "RB" is a game state where a bonus game is easily elected, that is the bonus game in which a player can get fifteen coins if the symbol combination "6-6-6" is completed. During "RB," a player can play the bonus game eight times in maximum. Also, during "RB," neither "BB" nor "RB" are elected.

As for other wins, there are "lower ranks" such as: fifteen coins are paid when "5-5-5" is displayed along a winning line 76, eight coins are paid when "9-9-9" is displayed, four coins are paid when "1-1-1" or "8-8-8" is displayed, and two coins are paid when "2-2-2" is displayed. In addition, if "6-6-6" is displayed along winning line 76, then "replay" comes. Further, the winning symbols may be not only numerals but also characters (animals and persons) or fruits such as cherry and orange.

Referring to flowcharts of FIGS. 5 to 10, the operation of Pachi-Slo machine 60 under control by microcomputer 200 will be explained.

Figure 5:
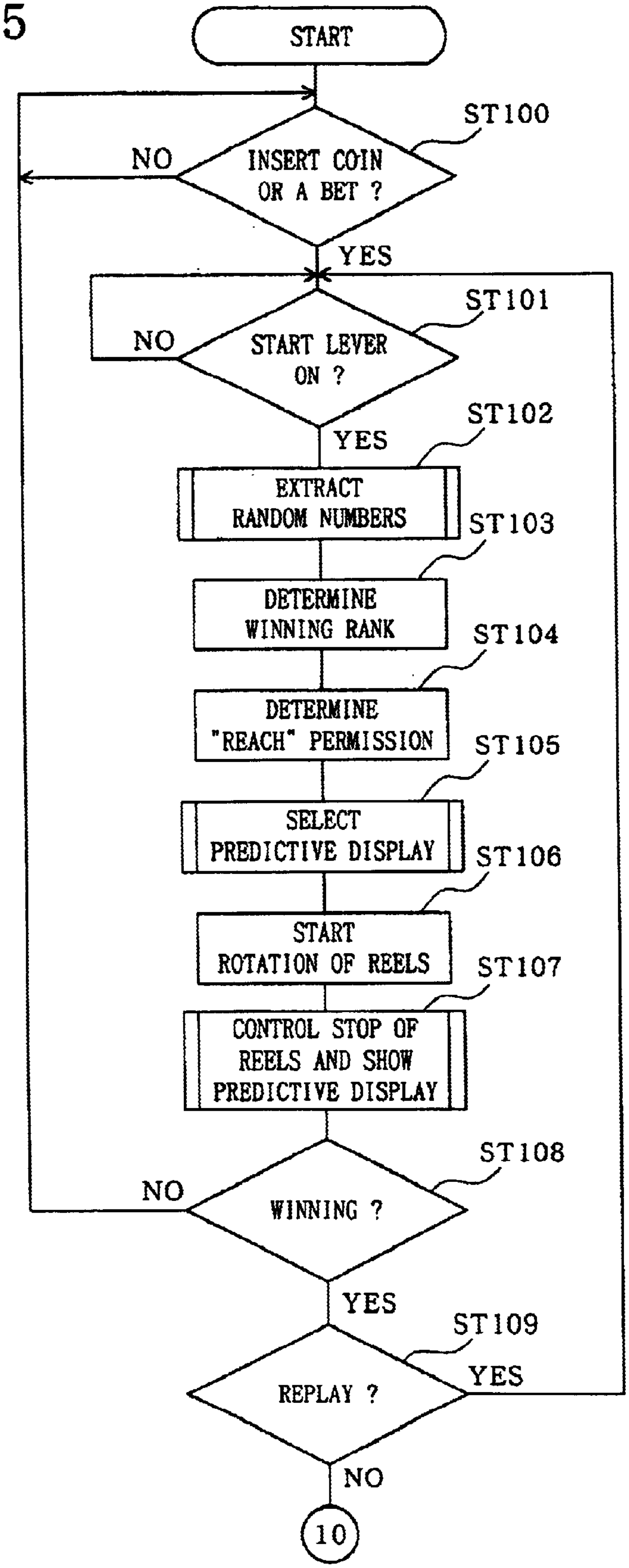
FIG. 5 is a flowchart showing a procedure for determining prognostic to be displayed by the liquid crystal display.
Figure 6:
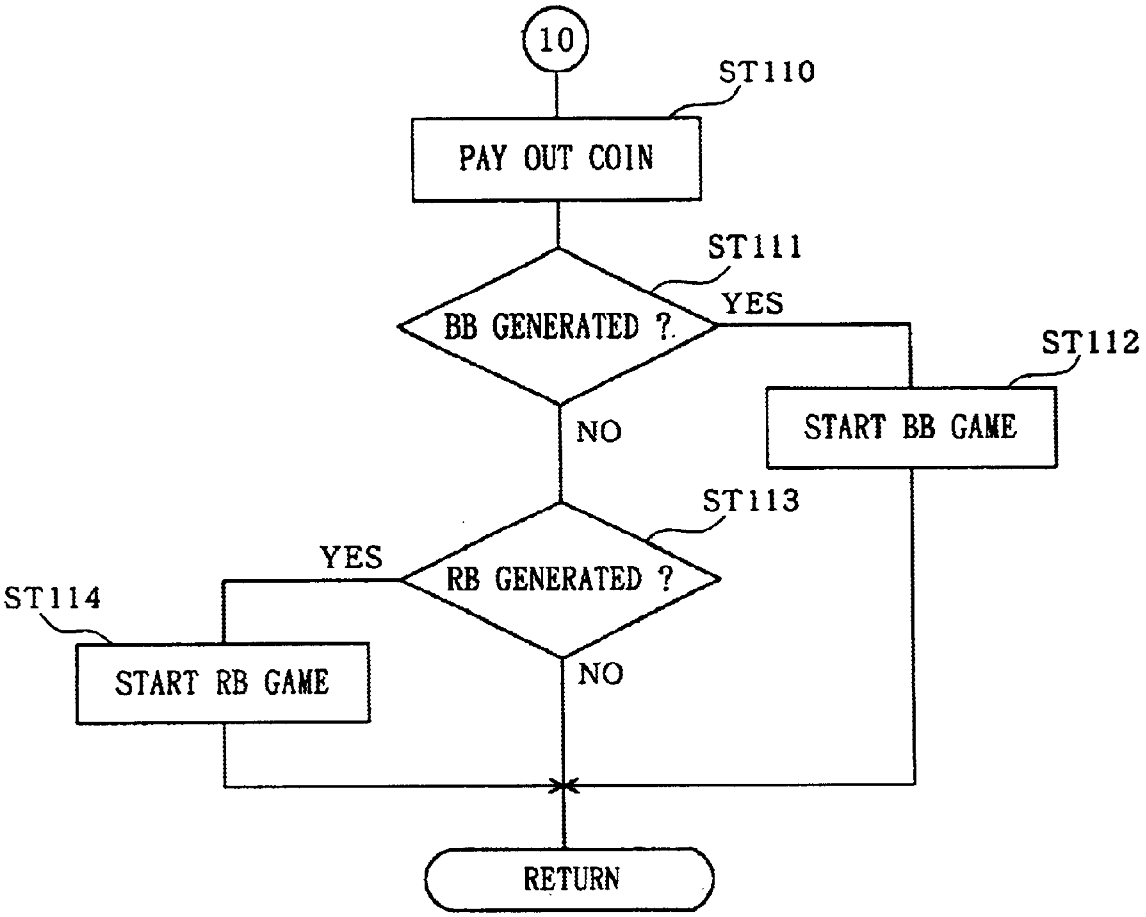
FIG. 6 is a continuation of the flowchart of FIG. 5.

In FIG. 5, if a detection signal is input from coin sensor 65S by insertion of a coin to coin inlet 65 or input from a BET switch (1-BET switch 67, 2-BET switch 68 or MAX-BET switch 69) (ST100), then CPU 201 determinates whether or not an input (start signal) is sent from start switch 70S in response to manipulation of start lever 70 (ST101). If the determination is "YES," CPU 201 makes random number extraction (ST102). In the random number extraction procedure, it extracts random numbers necessary for determination of winning rank and display content in liquid crystal display 64.

Figure 7:
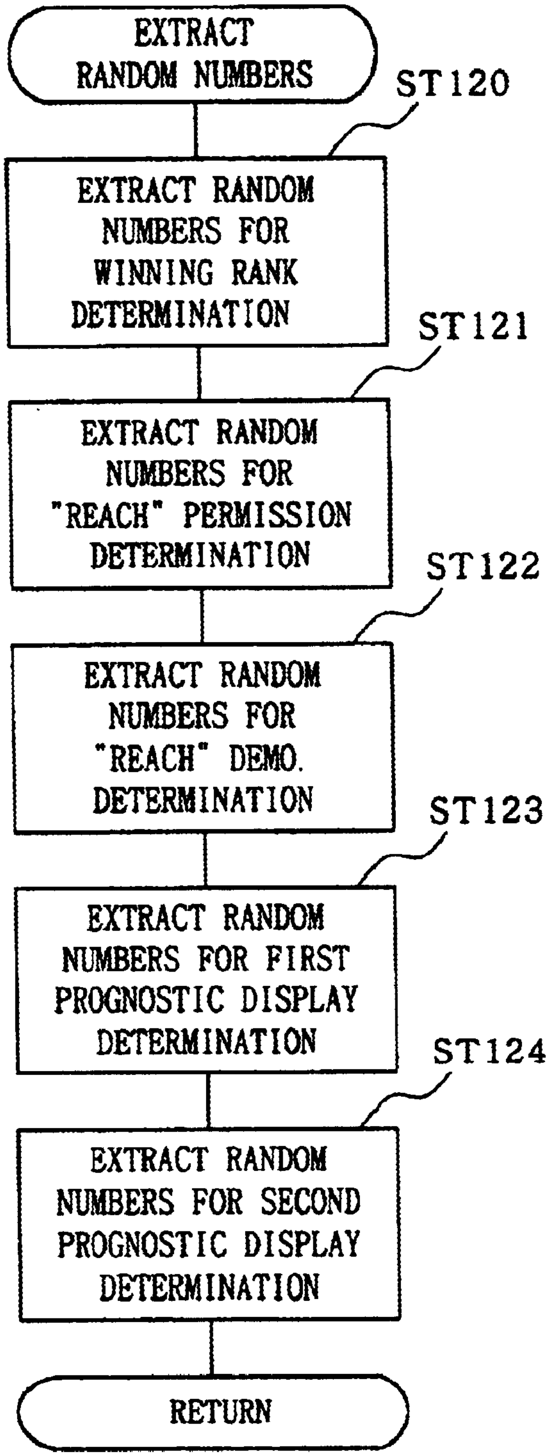
FIG. 7 is a flowchart showing procedures for random number extraction.

Random number extraction is executed in procedure shown by a flowchart of FIG. 7, and a range of random number to be extracted is shown in FIG. 11.

First, one random number is extracted in a range of "0" to "16383" for determination of winning rank (ST120).

Next, one random number is extracted in the range of "0" to "1" for determination of "reach permission" (ST121).

One random number is extracted in the range of "0" to "139" for determination of "reach demonstration" (ST122).

One random number is extracted in the range of "0" to "39" for determination of the first prognostic display (ST123).

Lastly, one random number is extracted in the range of "0" to "39" for determination of the second prognostic display (ST124).

In the flowchart of FIG. 5 again, CPU 201 determines the winning rank (ST103) after the random number extraction. In determination of winning rank, a table for winning rank determination as shown in FIG. 12 is referred to. The winning rank is determined by which range of random number value a random number extracted in ST120 belongs to. If the extracted random number belongs to the range of "0" to "49, then the winning rank is "BB" and "BB hit" is elected. If the winning rank is not "BB," then "BB lost" is elected and "RB" or loss comes.

In the following explanation, the winning rank determined by the random number extraction procedure is termed "internally elected rank."

After the internally elected rank is determined as explained above, CPU 201 determines whether or not it is permitted to make reels 63L to 63R to be in a "reach" state when the reels are stopped by a player's manipulation, that is termed each permission determination (ST104). In the determination of "reach permission," a table for "reach" permission determination that is shown in FIG. 13 is referred. If a random number for "reach" permission determination extracted by procedure of ST103 is "0," "reach" is permitted, and if the random number is "1," "reach" is not permitted.

Next, CPU 201 proceduree s to select the display contents of "reach demonstration" and "prognostic display" that are indicated as predictive display for "BB hit" (predictive display selection procedure) (ST105). The details on this procedure will be explained later referring to a flowchart of FIG. 8.

After the internally elected rank, the "reach" permission and the contents of the predictive display are determined as mentioned above, CPU 201 sends drive signal to motor drive circuit 305 to drive reels 63L, 63C, 63R (ST106).

When a player manipulates stop buttons 71L to 71R, CPU 201 controls to stop reels 63L to 63R and to indicate the predictive display on liquid crystal display screen 64 on the basis of the above-mentioned determinations (ST107). The details on this procedure will be explained later referring to flowcharts of FIG. 9 and FIG. 10.

CPU 201 determinates whether or not reels 63L to 63R are stopped to form the winning symbol combination of the internally elected rank (ST108), and if "YES," then it determines whether or not the winning is "replay" (ST109). If the determination is "YES," then the procedure returns to ST101. If "NO," then CPU 201 performs pay-out of coins corresponding to the winning from hopper 300 (ST110 of FIG. 6).

After the pay-out of coins, CPU 201 determinates whether or not "BB" is generated by the winning (ST111). If the determination is "YES," CPU 201 executes "BB" (ST112). If "NO," it determinates whether or not "RB" is generated by the winning (ST113), and if "YES," it executes "RB" (ST114).

Figure 8:
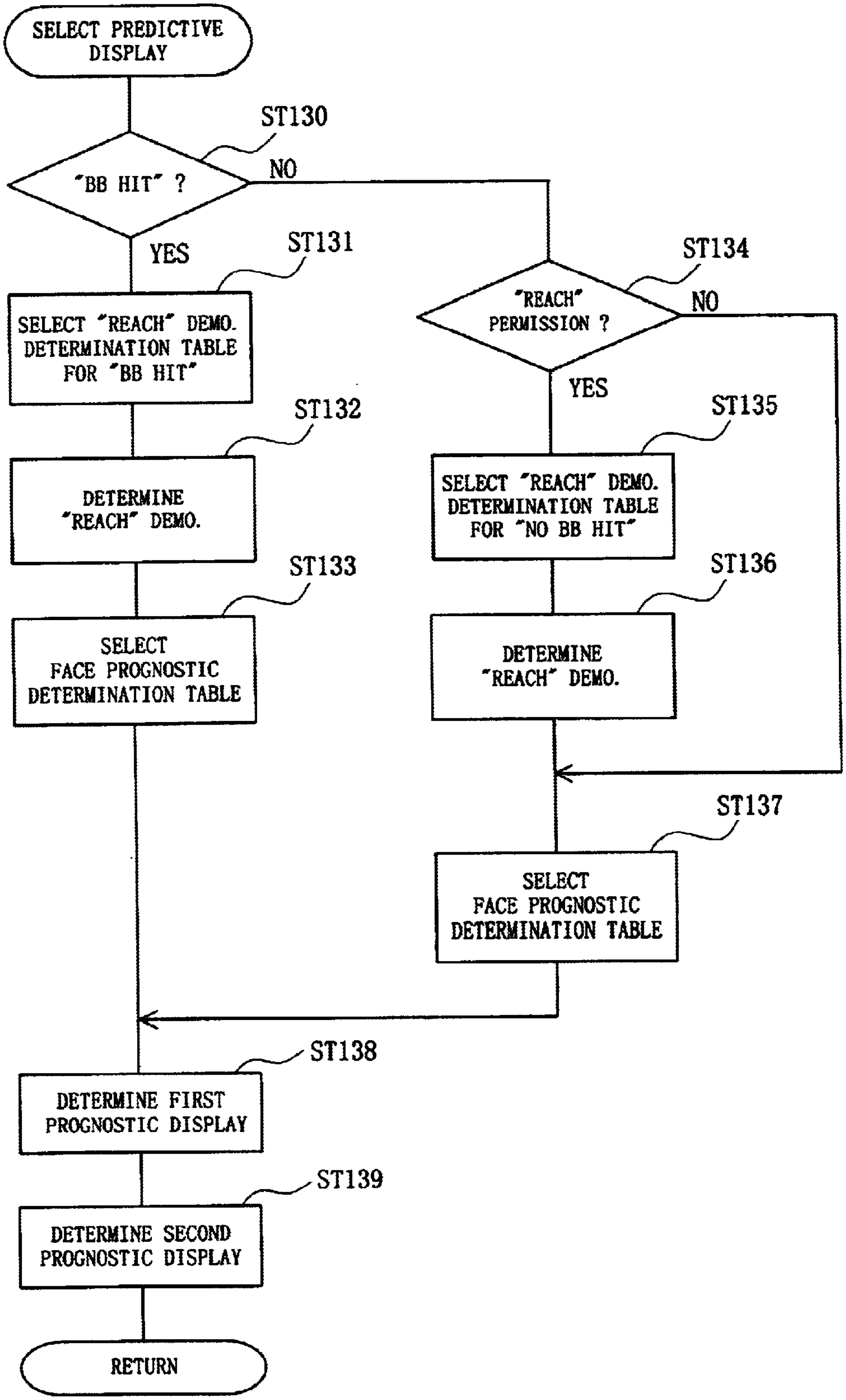
FIG. 8 is a flowchart showing a procedure for predictive display selection.

Next, FIG. 8 is a flowchart that shows the predictive display selection procedure in ST105 of FIG. 5.

CPU 201 determines whether or not the internally elected rank is "BB" (ST130). If the determination is "YES," CPU 201 selects one of three tables for determination of "reach demonstration for BB hit" in cases (I), (II) and (III) shown in FIG. 14 (ST131), and determines a kind of "reach" demonstration to be displayed based on the random number for determination of "reach demonstration" extracted in ST122 (ST132). That is, the "reach demonstration" to be displayed is determined in such a way that "clapping reach," "harite reach," or "all rotation reach" is determined if the extracted random number for determination of "reach demonstration" is in a range of "0" to "24," "25" to "64," or "165" to "139."

In liquid crystal display 64, the "clapping reach" is displayed as shown in FIG. 17, indicating that a boy named "Kintaro" is clapping. The "harite reach" is displayed as shown in FIG. 18, indicating that "Kintaro" performs arite action, that is, "Kintaro" hits a face of somebody or the like by a palm of his hand. The "all rotation reach" indicates that all of three reels start rotation slowly at once in line with the same symbol and stop at the same time after a predetermined time.

Figure 16:
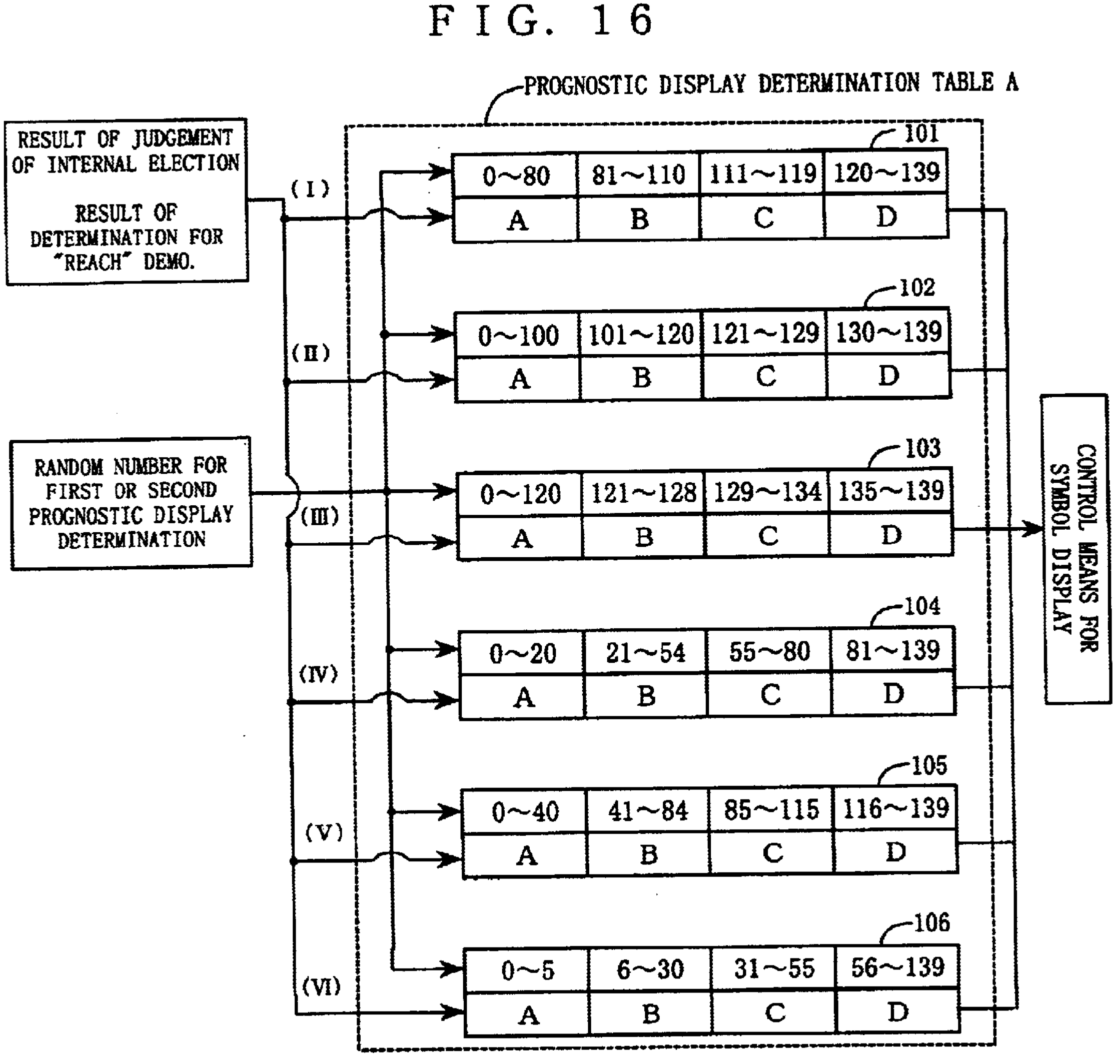
FIG. 16 shows a table for the determination of "prognostic display" correlated to random number ranges.

Based on the "reach" demonstration that is determined in ST132, among a first prognostic facial expression determination table 101, a second prognostic facial expression determination table 102, and a third prognostic facial expression determination table 103 that are shown in FIG. 16, one is selected (ST133). If the "reach demonstration" determined here is "clapping reach," "harite reach," or "all rotation reach," then the first prognostic facial expression determination table 101, the second prognostic facial expression determination table 102, or the third prognostic facial expression determination table 103 is selected, respectively.

The "prognostic facial expression" determination table shown in FIG. 2 corresponds to the first prognostic facial expression determination table 101. More specifically, A, B, C and D in the first prognostic facial expression determination table 101 of FIG. 16 are identical to A group, B group, C group and D group in the table of FIG. 2, respectively. In addition, each random number range attributed to each group is further divided, whereby the prognostic display symbol is associated with a respective further division of the predetermined random number range. In the example shown in FIG. 2, each random number range is divided into two ranges such that the range of 0 to 80 is divided into two ranges of 0 to 40 and 41 to 80; the range of 81 to 110 is divided into two ranges of 81 to 96 and 97 to 110; the range 111 to 119 is divided into two ranges of 111 to 115 and 116 to 119; and the range of 120 to 139 is divided into two ranges of 120 to 129 and 130 to 139. Face symbols of "Kintaro" with different facial expressions as the prognostic display are associated with the divided random number value ranges, respectively.

The selection of a particular prognostic facial expression determination table from the six prognostic facial expression determination tables is executed based on the result of the determination whether or not there will be a "BB hit" in ST130 of FIG. 8, together with the result of the determination of the "reach demonstration" in ST132 of FIG. 8. When the combination of the results of the determination whether or not there will be a "BB hit" and the determination of the "reach demonstration" corresponds to (I) "BB hit"+"clapping reach" the first prognostic facial expression determination table 101 is used; when the above combination corresponds to (II) "BB hit"+"harite reach" the "second prognostic facial expression" determination table 102 is used; when the above combination corresponds to (III) "BB hit"+"all rotation reach" the third prognostic facial expression determination table 103 is used; when the above combination corresponds to (IV) "no BB hit"+"clapping reach" the fourth prognostic facial expression determination table 104 is used; when the above combination corresponds to (V) "no BB hit"+"harite reach" the fifth prognostic facial expression determination table 105 is used; and when the above combination corresponds to (VI) "no BB hit"+"no reach" the sixth prognostic facial expression determination table 106 is used.

If the determination is "NO" in ST130, CPU 201 determinates whether or not "reach" permission is made (ST134), and if "YES," CPU 201 selects "reach demonstration determination table for BB lost" shown in FIG. 15 (ST135) and determines a kind of "reach" demonstration to be displayed based on the random number for determination of "reach demonstration" extracted in ST122 (ST136). That is, the "reach demonstration" to be displayed is determined in such a way that "clapping reach," "harite reach," or "no reach" is determined if the extracted random number for determination of "reach demonstration" is in a range of "0" to "4," "5" to "8," or "9'to "139."

Based on the "reach" demonstration that is determined in ST136, among a fourth prognostic facial expression determination table 104 and a fifth prognostic facial expression determination table 105 that are shown in FIG. 16, one is selected (ST137). If the "reach" demonstration determined here is "clapping reach" or "harite reach," then the fourth prognostic facial expression determination table 104 or the fifth prognostic facial expression determination table 105 is selected, respectively.

If the determination is "NO" in ST134, then CPU 210 goes to step ST137 without determination of "reach demonstration" and selects a sixth prognostic facial expression determination table 106.

Then, referring to the prognostic facial expression determination table that is selected in ST133 or ST137, CPU 201 determines which range of random number value in the prognostic facial expression determination table the random number for determination of the first prognostic display extracted in ST123 belongs to, thus it determines the first prognostic display to be indicated at the first time (ST138). CPU 201 further determinates which range of random number value in the prognostic facial expression determination table the random number for determination of the second prognostic display extracted in ST124 belongs to, thus it determines the second prognostic display to be indicated in the second time (ST139).

As can be seen from the random number value range of FIG. 14, when the determination of the "internal election" results in the "BB hit" (i.e., the aforementioned (I) to (III)), the range of random number values of the A group is arranged to be broad in this embodiment, and therefore the frequency of displaying the face symbols of the A group is high. Accordingly, if the face symbol belonging to the A group is displayed, the player will easily recognize the high likelihood of the "BB hit." Alternatively, when the determination of the "internal election" results in "no BB hit" (i.e., the aforementioned (IV) to (VI)), the random number value range of the D group is arranged broad in this embodiment, which results in the frequency of displaying the face symbols belonging to the D group to be high. Accordingly, if the face symbol belonging to the D group is displayed, the player will easily recognize the low likelihood of the "BB hit."

As shown in FIG. 2, the "Kintaro" symbols having a laughing facial expression are associated with the face symbols belonging to the A group. Since the "BB hit" corresponds to a winning mode that gives a large award to the player, the laughing facial expression reflects the player's joyous feeling when the "BB hit" appears, and is effective for the player to easily recognize a high likelihood of the appearance of the "BB hit."

On the other hand, the "Kintaro" symbols having a crying facial expression are associated with the face symbols belonging to the D group. The crying expression reflects the player's joyless feeling when the "BB hit" does not appear, and is effective for the player to recognize easily a low likelihood of the appearance of the "BB hit."

The "Kintaro" symbols having unmanly facial expressions and ordinary facial expressions are associated with the face symbols belonging to the B and C groups, respectively. These symbols do not readily reflect to the player any prediction of a "BB hit" or "loss." However, when the above facial expressions are displayed in combination with a facial expression of the A group or t of he D group, the player may deduce predictive information therefrom as to the likelihood of the "BB hit." Moreover, a change in the perceived likelihood of the "BB hit" will increase the player's interest in the game.

Figure 9:
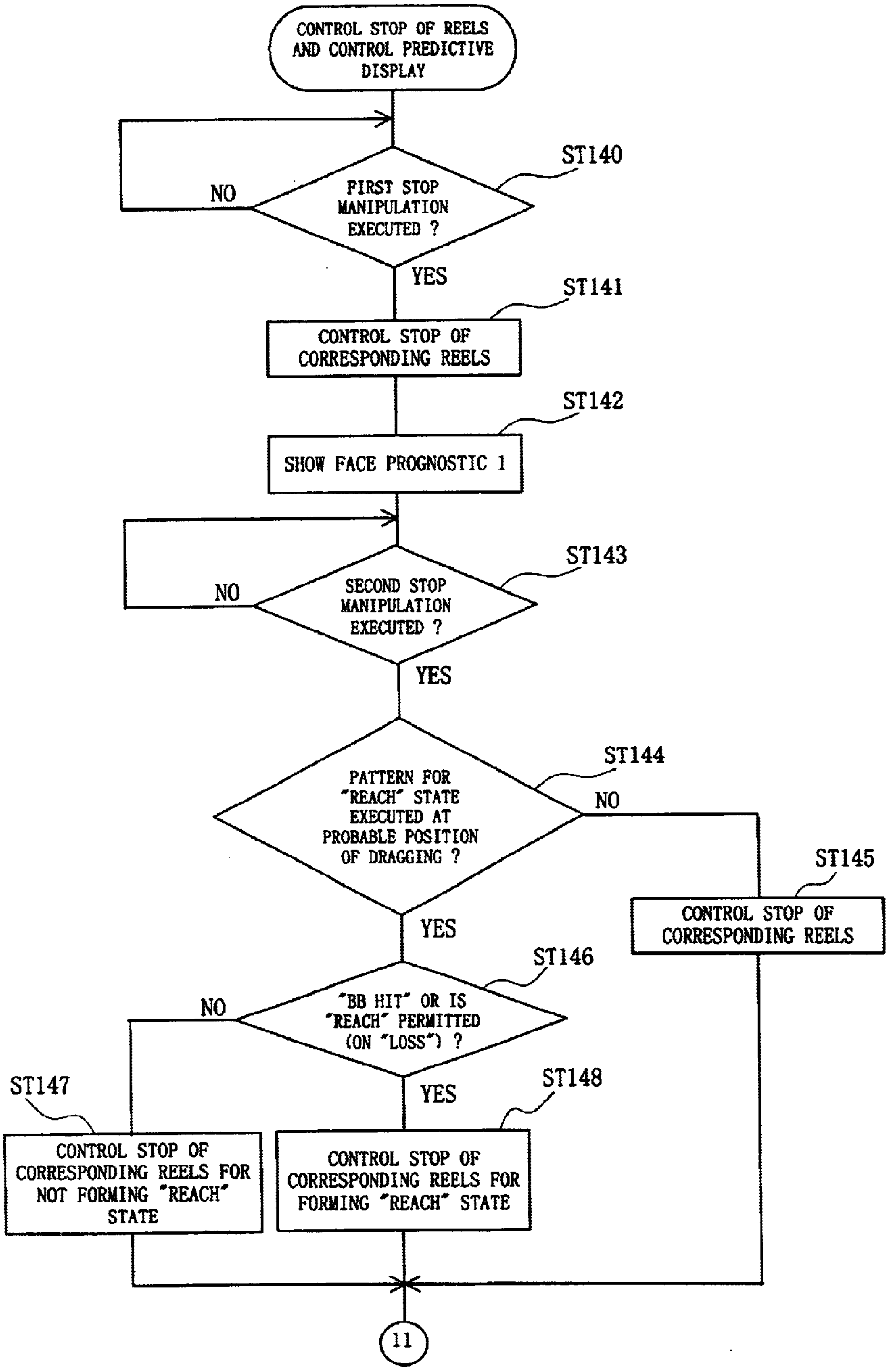
FIG. 9 is a flowchart showing a procedure for predictive display control.
Figure 10:
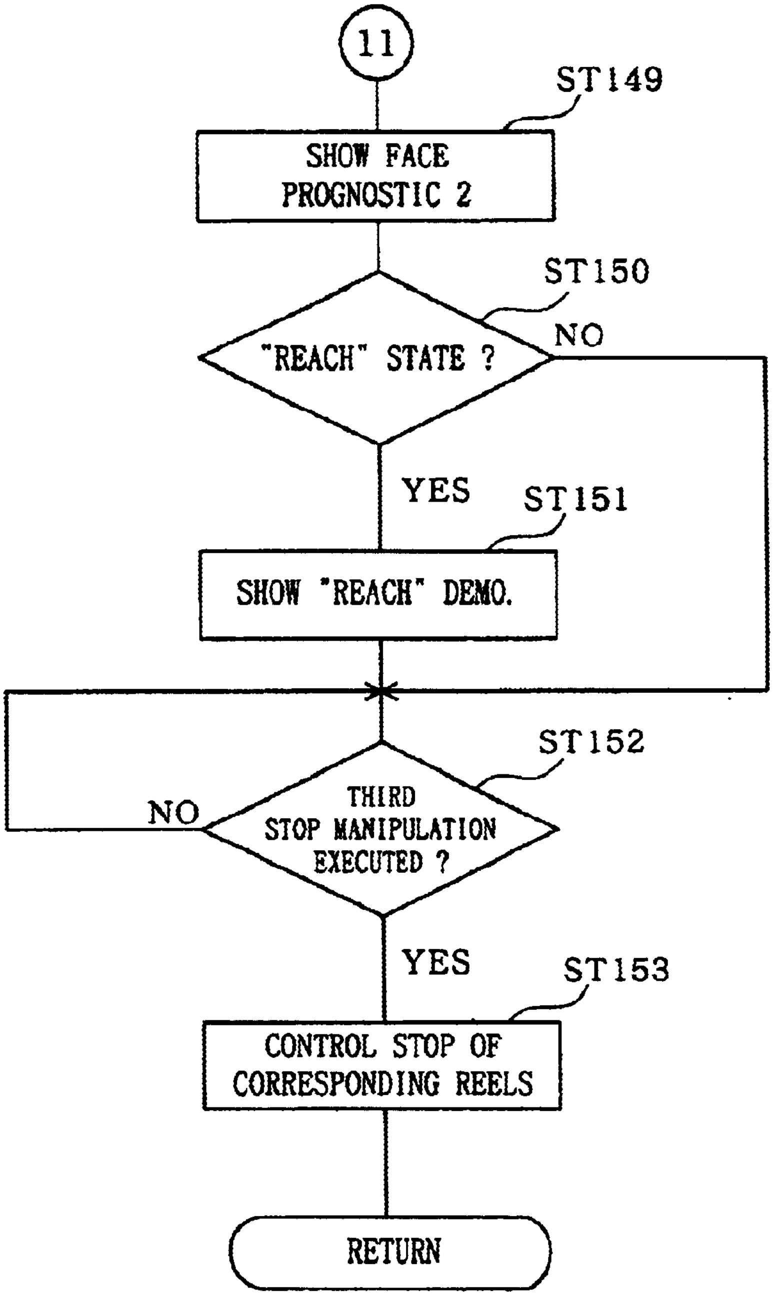
FIG. 10 is a continuation of the flowchart of FIG. 9.

Next, referring to flowcharts of FIGS. 9 and 10, the stop control of reels 63L to 63R in ST107 and the predictive display control of liquid crystal display 64 will be explained.

CPU 201 determines whether or not the first time stop manipulation (usually the push manipulation for the stop button 71L of the left side) is executed by a player (ST140). If the determination is "YES," CPU 201 controls stop of the reel (reel 63L of the left side if the stop button 71L of the left side is stopped) corresponding to the stop button that is stopped (ST141). After the first reel is stopped, the "face prognostic 1" that is selected as the first prognostic display is indicated (ST142).

Figure 19:
FIG. 19 is a representation that illustrates a display of "prognostic facial expression 1;"

The display example for "face prognostic 1" is shown in FIG. 19 where "Kintaro" with the laughing facial expression (face symbol 2 of FIG. 2) is displayed. The player therefore can predict that the likelihood of the BB hit must be high.

CPU 201 further determines whether or not the second time stop manipulation (usually the push manipulation for stop button 71R of the right side) is executed (ST143). If the determination is "YES," CPU 201 determines whether or not the stop manipulation is executed at position (generally in a range of four symbol positions from the point of stop manipulation) to which a symbol for the "reach state" is permitted to come (ST144).

If the determination is "NO" in ST144, then CPU 201 executes stop control corresponding to the stop manipulation (ST145). If "YES" in ST144, then CPU 201 determines whether or not the result of "internal election" is "BB," or whether or not the "reach permission" is made except "BB"(ST146). If the determination is "YES," CPU 201 controls stop of the second reel (63R) to form "reach state" (ST148), but if "NO," CPU 201 controls stop of the second reel (63R) not to form "reach state" (ST147).

After the first and second reels are stopped, "face prognostic 2," which is selected as the second prognostic display, is indicated (ST149).

Figure 20:
FIG. 20 is a representation that illustrates a display of "prognostic facial expression 2;"

The display example for "face prognostic 2" is shown in FIG. 20 where "Kintaro" with the "effeminate facial expression" (face symbol 4 of FIG. 2) is displayed. The player who recognizes these displays will know that this face symbol is associated with the lower likelihood group than the former laughing face group, the player may predict that the likelihood of "BB hit" must be lower than the likelihood previously recognized. When "Kintaro" with the laughing facial expression is displayed repeatedly, the player can predict that the likelihood of the "BB hit" is quite high. When the player recognizes this, the player tends to pay more attention to the stop movement of the last reel, with a high degree of anticipation.

CPU 201 determines whether or not the "reach state" is established as a result after two reels (63L, 63R) stopped (ST150). If the determination is "YES," CPU 201 executes displaying of the "reach demonstration" that is determined in ST132 or ST136 (ST151).

Then, CPU 201 determines whether or not the last stop manipulation (push manipulation for the central stop button 71C in the embodiment) is executed (ST152). If the determination is "YES," CPU 201 executes the stop control corresponding to the stop manipulation (ST153). Of course, the above stop manipulation is not limited to the order of left, right and center, but it may be executed in optional order by a player.

Figure 21:
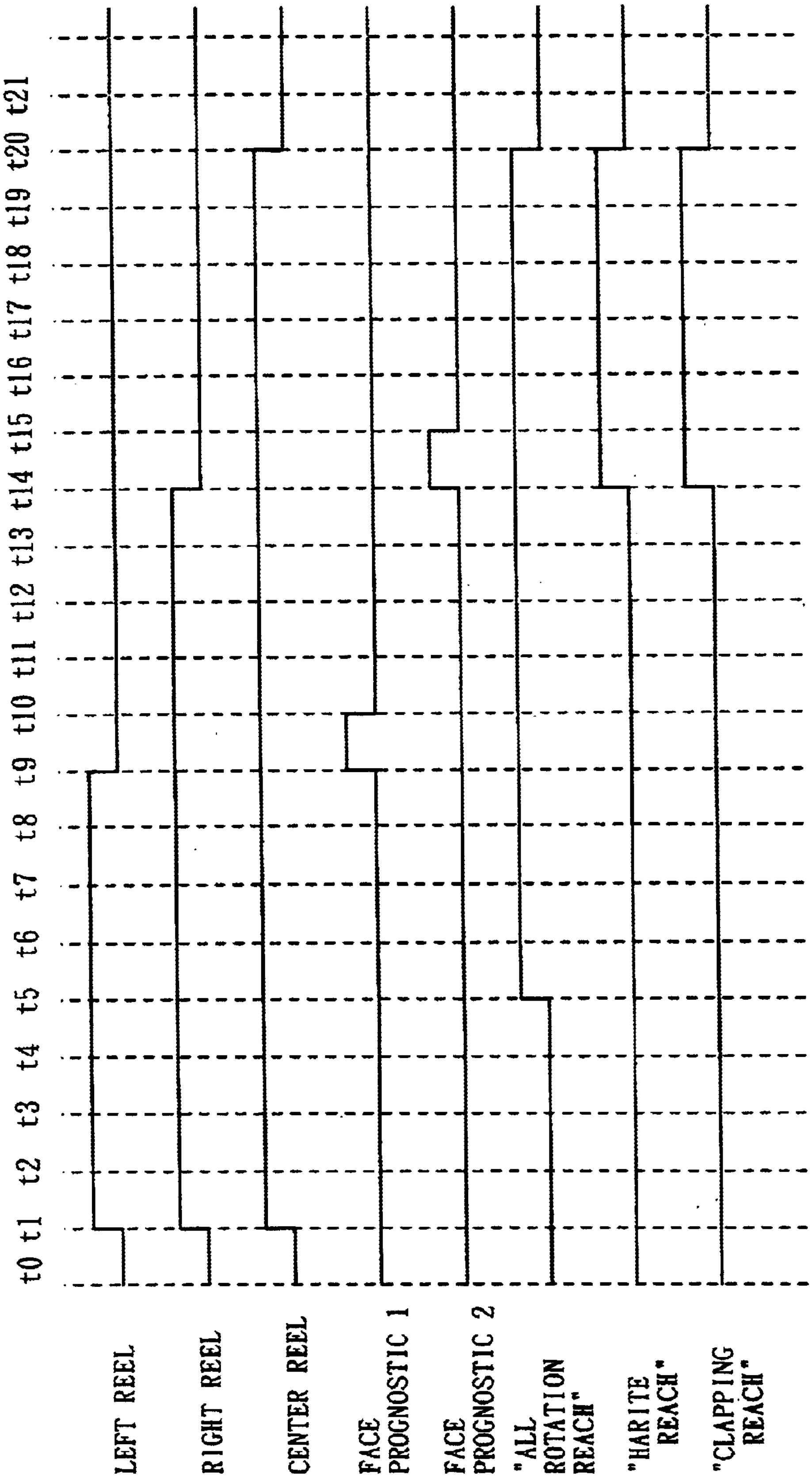
FIG. 21 is a graphical representation of a timing diagram of an example of display duration for variation of symbols, prognostic displays, and "reach demonstration;"

Also, display timings for the predictive displays ("face prognostic 1" and "face prognostic 2") may be of various patterns as follows:

FIG. 21 shows an illustrative graphical representation of a timing diagram of the display timing for the prognostic display performed by the changing facial expression of "Kintaro" mentioned above.

In FIG. 21, "face prognostic 1" is displayed when left reel 63L is stopped (t9), and "face prognostic 2" is displayed when right reel 63R is stopped (t14).

Figure 22:
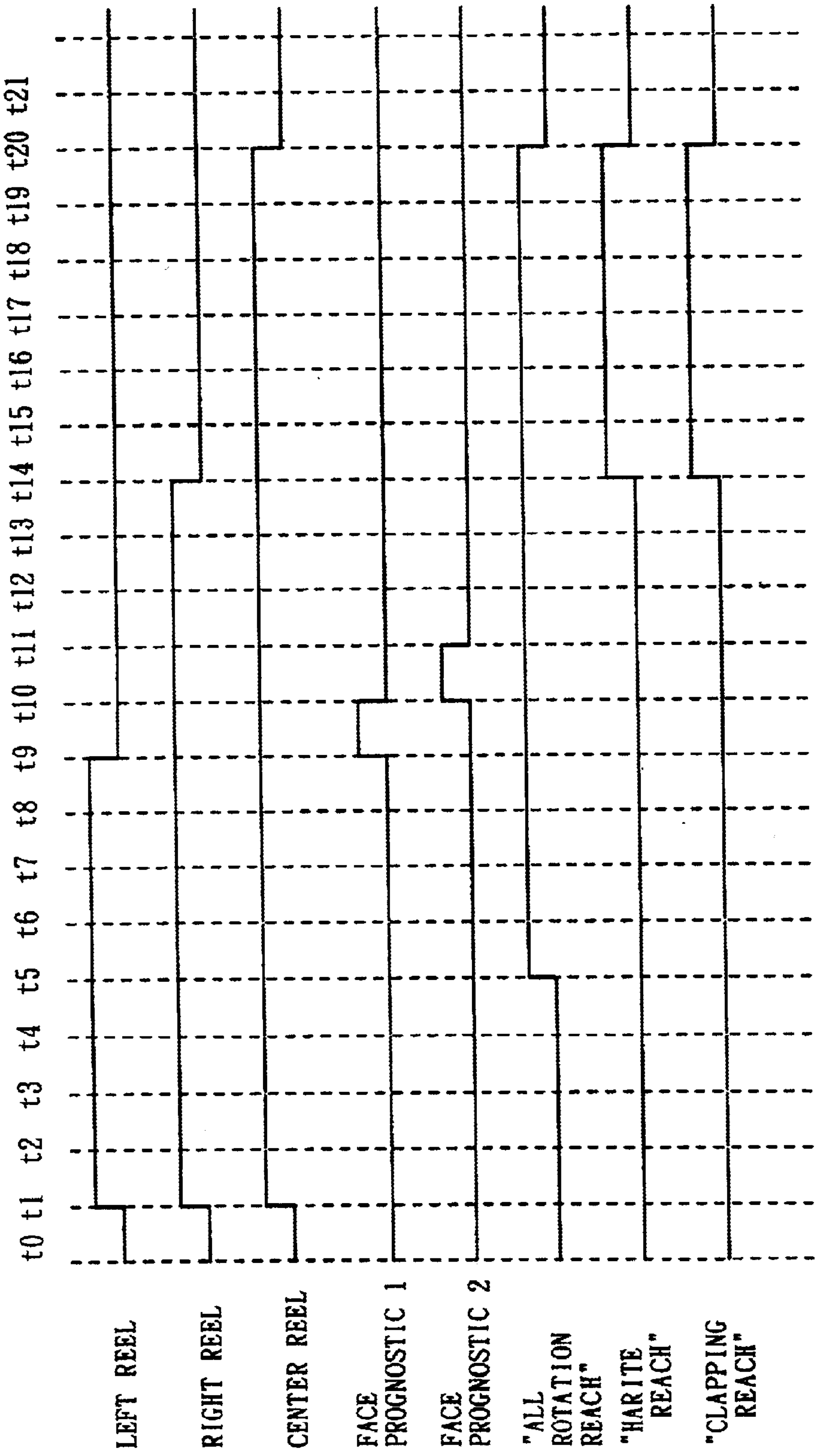
FIG. 22 is a graphical representation of a timing diagram of another example of display duration for variation of symbols, prognostic displays, and "reach demonstration;"

Alternatively, as shown in the timing diagram of FIG. 22, a plurality of the prognostic display symbols may sequentially be displayed until the one reel is stopped. In FIG. 22, "face prognostic 1" and "face prognostic 2" are sequentially displayed during the period after left reel 63L is stopped and until right reel 63R is stopped next (that is, from t9 to t14).

Although the display of the prognostic display symbol is to be executed synchronously with stopping of each reel, the display timing of the prognostic display symbols is not limited thereto. The following (1) to (7) of the display timing of the prognostic display symbols will be described below. These are grounded in the point of view that the prediction display is provided for predicting a special symbol display state that will appear when the rotating reel is stopped, by displaying a plurality of the prognostic display or the "reach demonstration" in sequential timing relative to each other. Although two types of the prognostic symbols are displayed in the following explanation, at least one or any number type of prognostic display symbols may be displayed in the invention.

Figure 23:
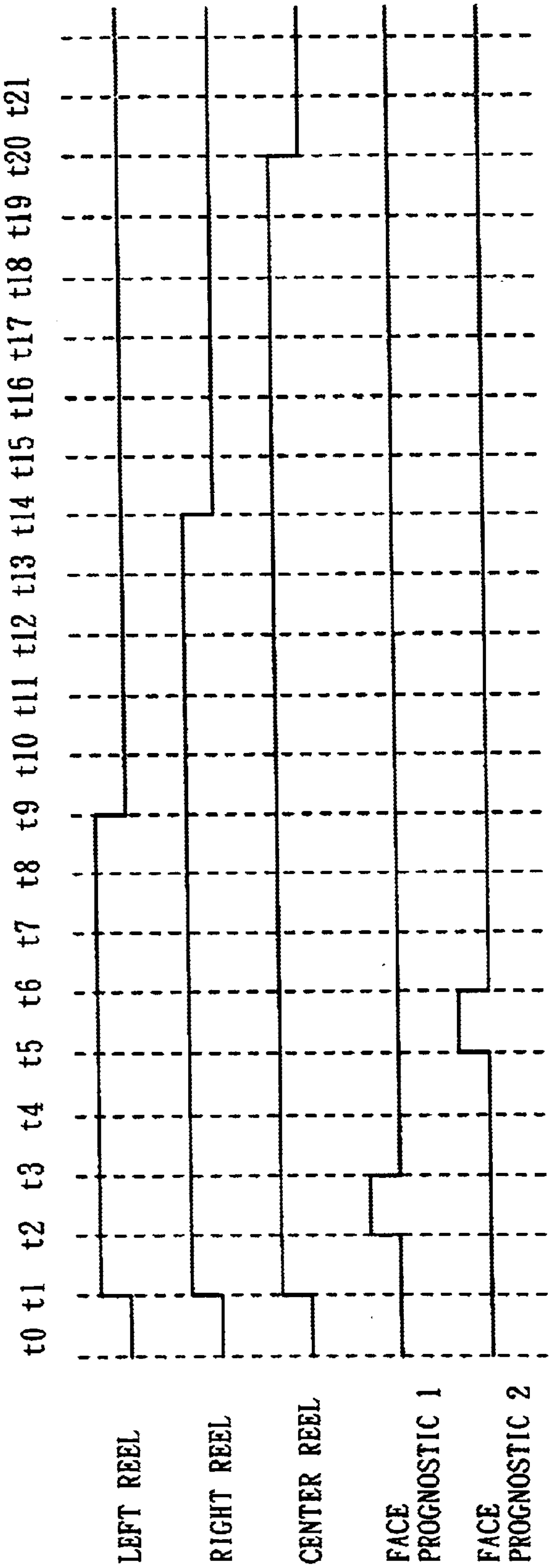
FIG. 23 is a graphical representation of a timing diagram of a first example of stop timing of the variation of symbols and display timing of prognostic display.

(1) The timing diagram of FIG. 23 shows an embodiment of the invention in which the prognostic display symbols are displayed during time period from the start of turns of the reels to the stop of a first one of the reels (hereinafter referred to the irst reel stop. Similarly, subsequent stopping of a second one of the reels is referred to as the econd reel stop and the stopping of a third one of the reels stop is referred to as the "third reel stop." The "face prognostic 1" and "face prognostic 2" are sequentially displayed after the turns of the three reels are started, such sequential display continuing until any one of the reels (left reel 63L in this embodiment) is stopped.

Figure 24:
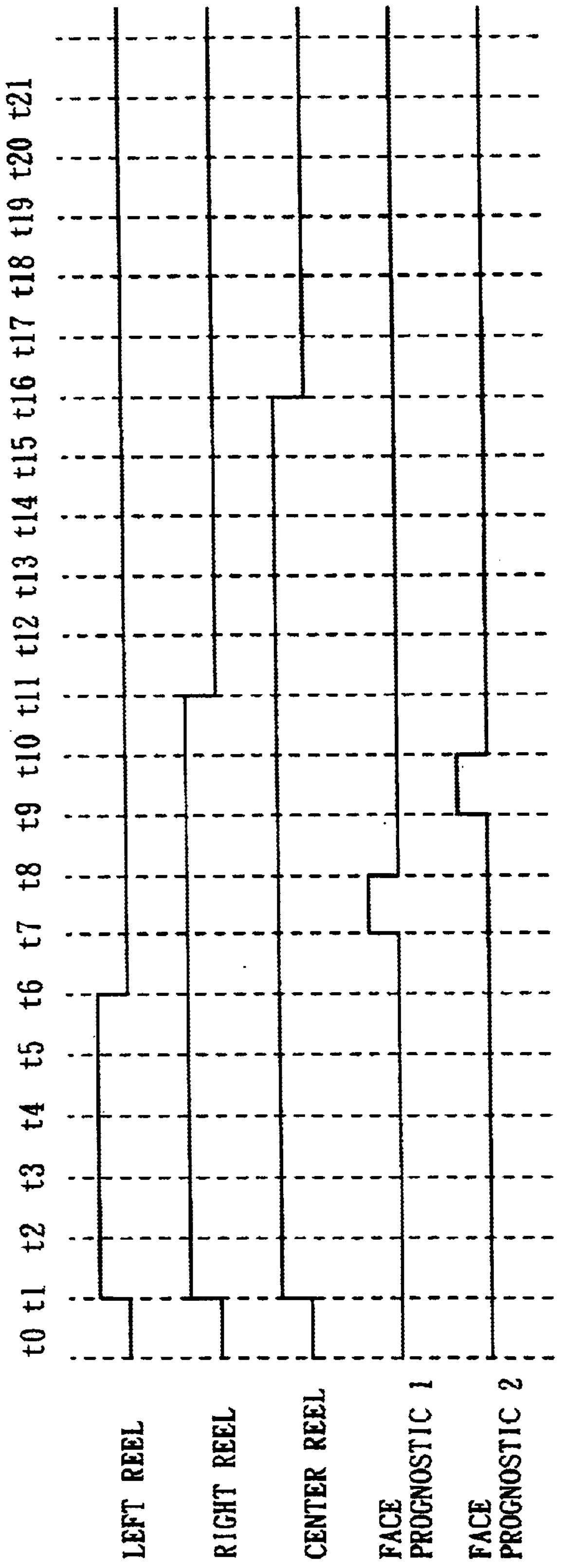
FIG. 24 is a graphical representation of a timing diagram of a second example of stop timing of the variation of symbols and display timing of prognostic display.

(2) The timing diagram in FIG. 24 shows an embodiment of the invention in which the prognostic display symbols are displayed from the first reel stop to the second reel stop. Turns of the three reels are started. From the time that any one of the other reels (left reel 63L in this embodiment) is stopped until any one of the other two reels (right reel 63R) is stopped, the "face prognostic 1" and the "face prognostic 2" are sequentially displayed.

Figure 25:
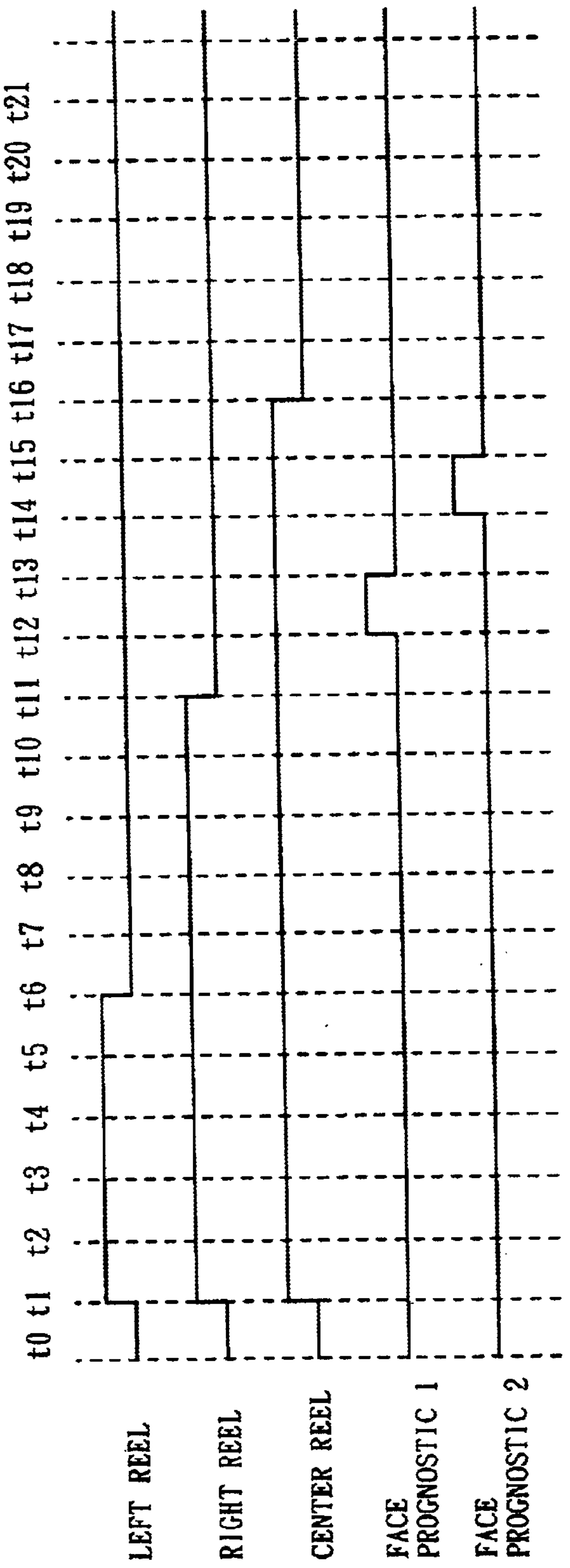
FIG. 25 is a graphical representation of a timing diagram of a third example of stop timing of the variation of symbols and display timing of prognostic display.

(3) The timing diagram in FIG. 25 shows an embodiment of the invention in which the prognostic display symbols are displayed from the second reel stop to the third reel stop. Turning of the three reels is started. Thereafter, any one of the other reels (left reel 63L in this embodiment) is stopped. During the period beginning after any one of the other two reels (right reel 63R) is stopped and until the last reel (center reel 63C) is stopped, the "face prognostic 1" and the "face prognostic 2" are sequentially displayed.

Figure 26:
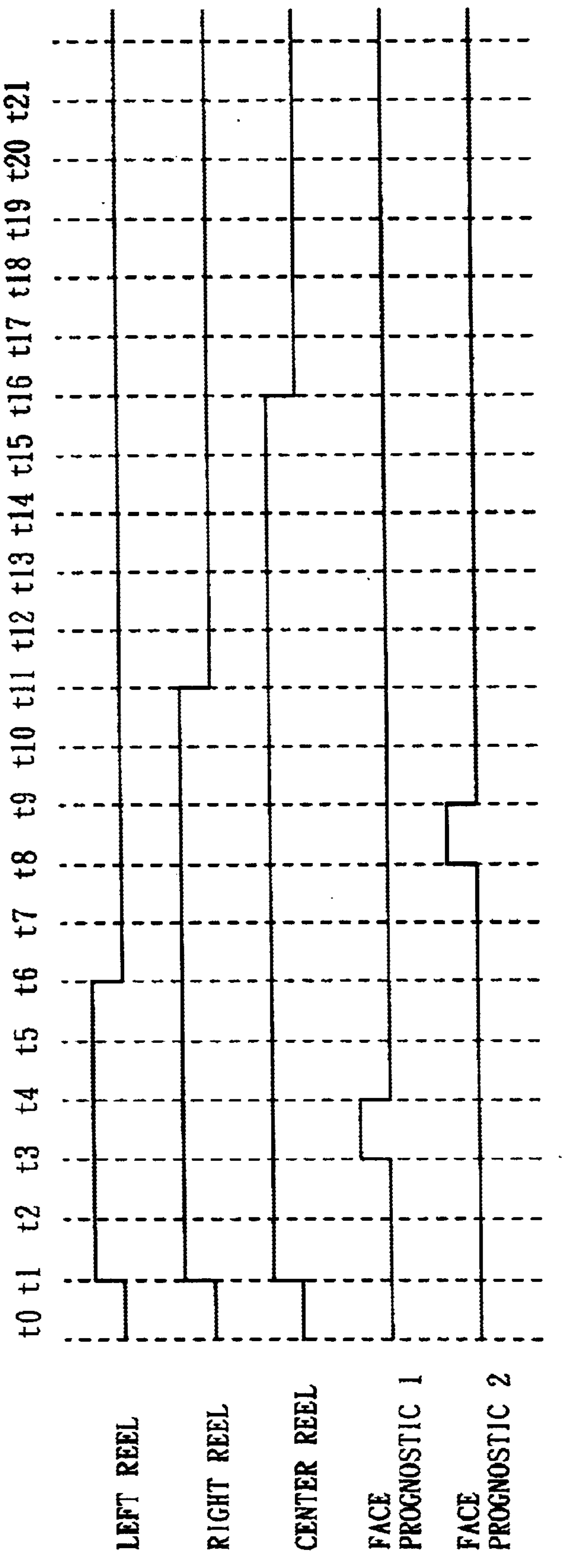
FIG. 26 is a graphical representation of a timing diagram of a fourth example of stop timing of the variation of symbols and display timing of prognostic display.

(4) The timing diagram in FIG. 26 shows an embodiment of the invention in which at least one prognostic display symbol is displayed during time period from the start of turns of the reels to the first reel stop, and at least one prognostic display symbol is displayed during time period from the first reel stop to the second reel stop. After the start of the turns of the three reels, the "face prognostic 1" is displayed until any one of the other two reels (left reel 63L in this embodiment) is stopped. The "face prognostic 2" is displayed after one reel has been stopped and until any one of the other two reels (right reel 63R) is stopped.

Figure 27:
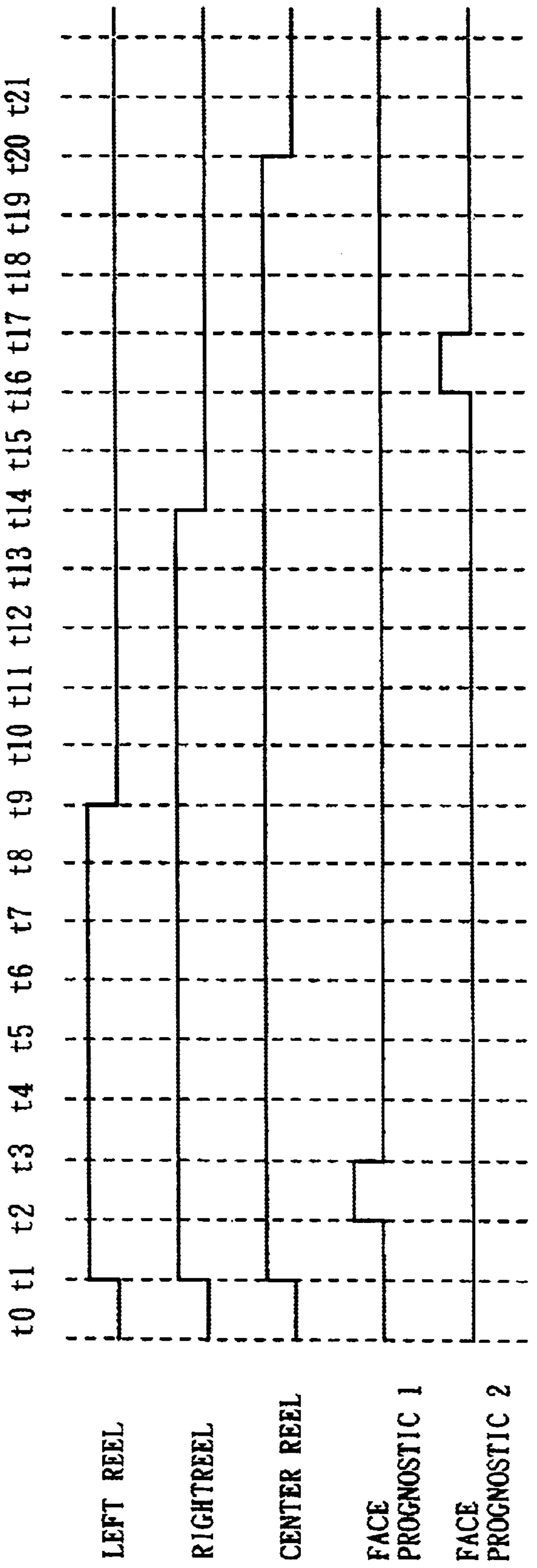
FIG. 27 is a graphical representation of a timing diagram of a fifth example of stop timing of the variation of symbols and display timing of prognostic display.

(5) The timing diagram in FIG. 27 shows an embodiment of the invention in which at least one prognostic display symbol is displayed from start of the turns of the reels to the first reel stop, and at least one prognostic display symbol is displayed from the second reel stop to the third reel stop. After the start of the turns of the three reels, the "face prognostic 1" is displayed until any one of the reels (left reel 63L in this embodiment) is stopped, and after one of the reel has been stopped, the "face prognostic 2" is displayed until the other reels (right reel 2R and center reel 63C) are stopped.

Figure 28:
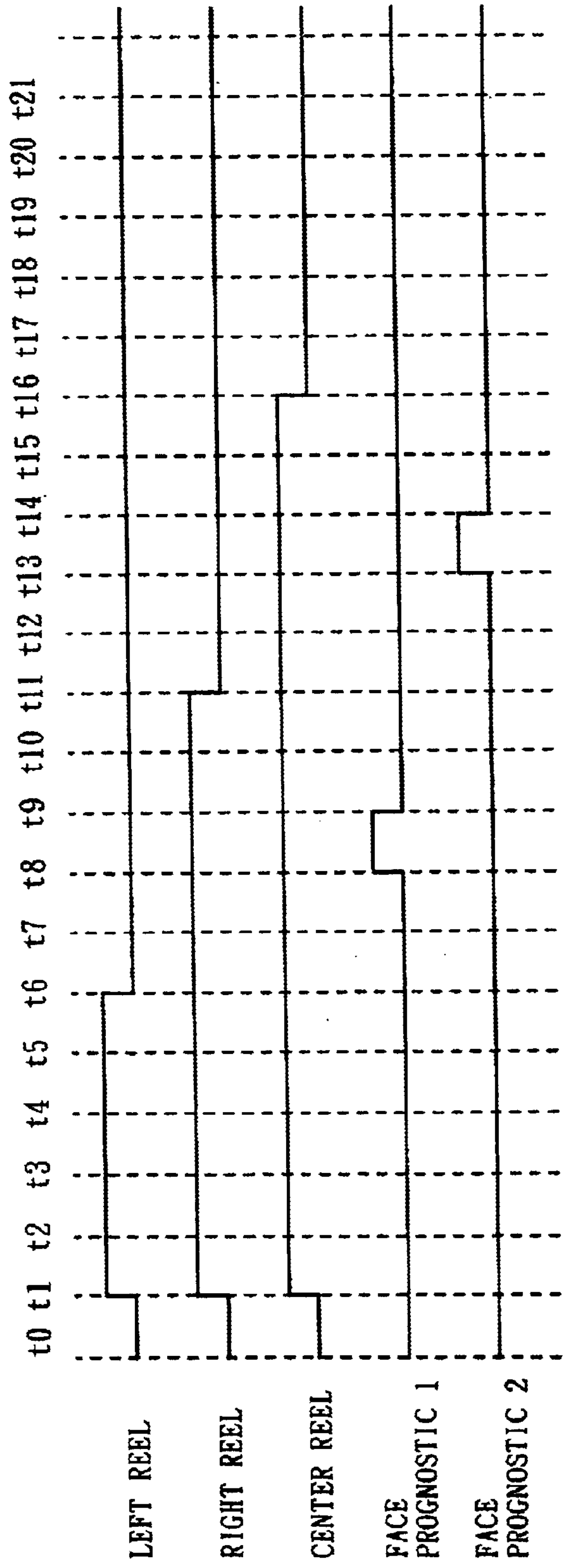
FIG. 28 is a graphical representation of a timing diagram of a sixth example of stop timing of the variation of symbols and display timing for prognostic display.

(6) The timing diagram in FIG. 28 shows an embodiment of the invention in which the start of the turns of the reels, at least one prognostic display symbol is displayed from the first reel stop to the second reel stop, and at least one prognostic display symbol is displayed from the second reel stop to the third reel stop. Turns of the three reels are started, and thereafter any one of the reels (left reel 63L in this embodiment) is stopped. The "face prognostic 1" is then displayed before any one of the other two reels (right reel 63R) is stopped. After the variations of two variable symbols have been stopped, the "face prognostic 2" is displayed until the last reel (center reel 63C) is stopped.

Figure 29:
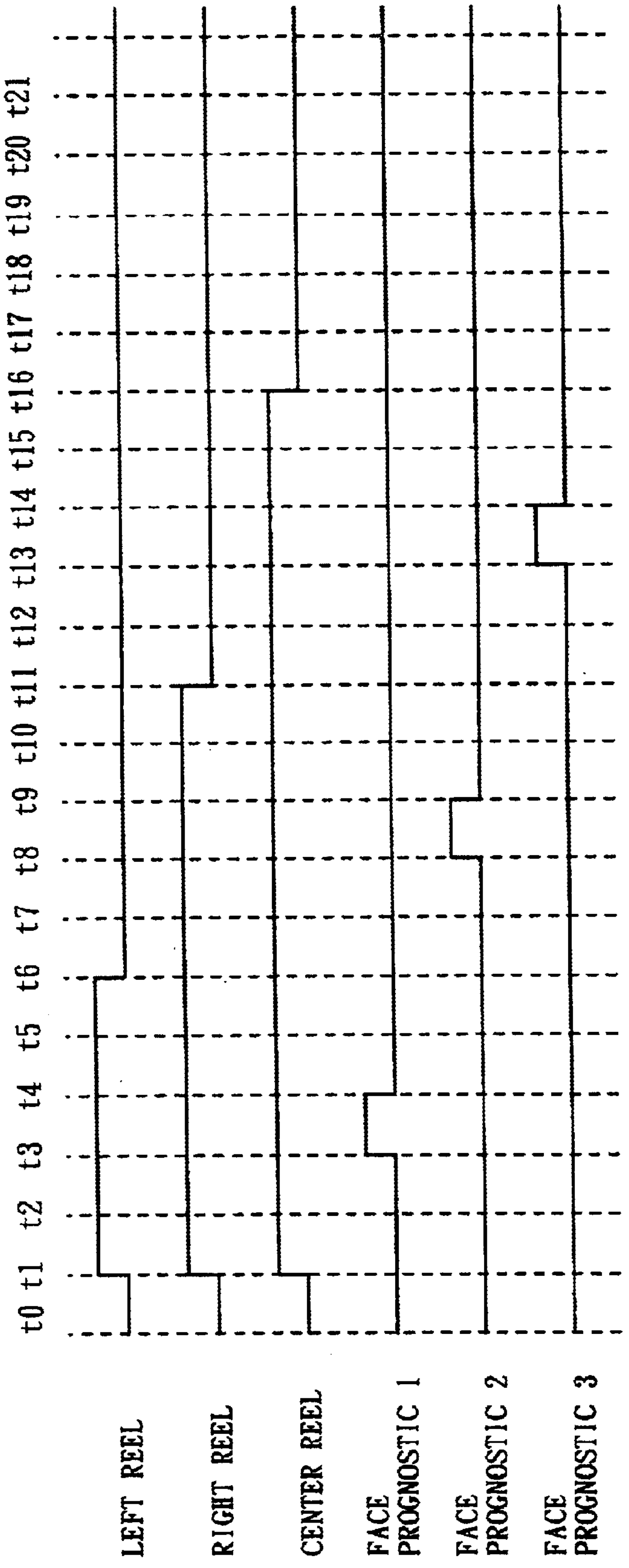
FIG. 29 is a graphical representation of a timing diagram of a seventh example of stop timing of the variation of symbols and display timing for prognostic display.

(7) The timing diagram in FIG. 29 shows an embodiment of the invention for displaying the prognostic display symbol in which at least one prognostic display symbol is displayed from the start of the turns of reel display to the first reel stop, at least one prognostic display symbol is displayed from the first reel stop to the second reel stop, and at least one prognostic display symbol is displayed from the second reel stop to the third reel stop. After the start of the turns of the three reels, "face prognostic 1" is displayed until any one of the reels (left reel 63L in this embodiment) is stopped. The "face prognostic 2" is displayed until any one of the other two reels (right reel 63C) is stopped, and the ace prognostic 3 is displayed until the last reels (center reel 63C) is stopped. In this case, the ace prognostic 3 is used in embodiments that display three kinds of prognostic facial expression symbols instead of two kinds of prognostic facial expression symbols.

Figure 30:
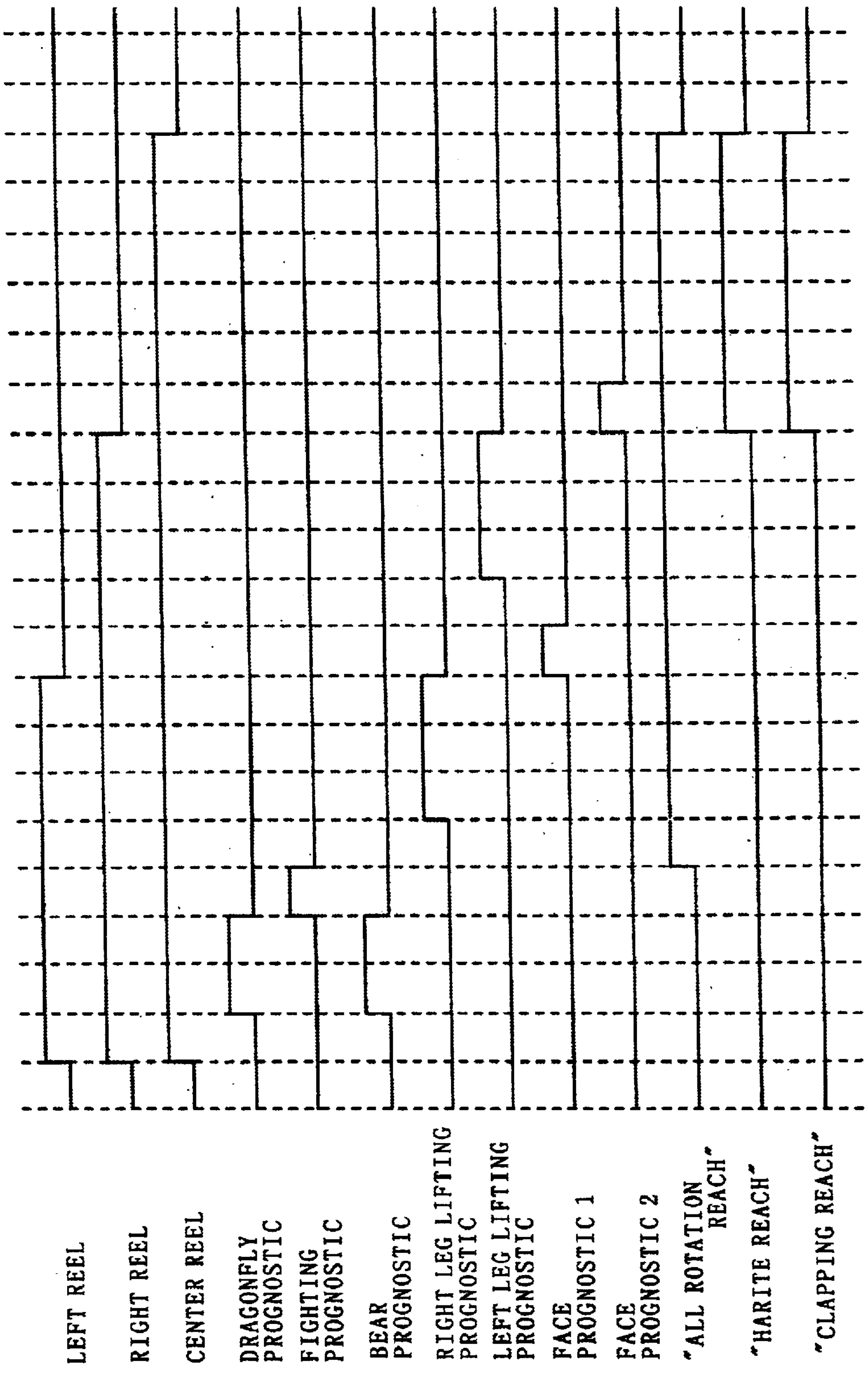
FIG. 30 is a graphical representation of a timing diagram of a third example of display duration for variation of symbols, prognostic displays, and "reach demonstration;"

FIG. 30 is a graphical representation of a timing diagram for the display timing of the prognostic display, wherein prognostic displays such as the "dragon fly prognostic" the "fighting prognostic" the "bear prognostic" the "left leg lifting prognostic" and the "right leg lifting prognostic" are further added. A determination method for these prognostic displays will be explained hereinafter.

The "dragon fly prognostic" the "fighting prognostic" and the "bear prognostic" are each displays for predicting the appearance of BB which is "BB hit" with a predetermined likelihood, and are each displayed when the likelihood of the "BB hit" is quite high. The display timing is arranged to be displayed for a certain period in a time from the start of the turn of the three reels to the stop of any one of the reels (left reel 63L in this embodiment) (t1 to t9).

Figure 31:
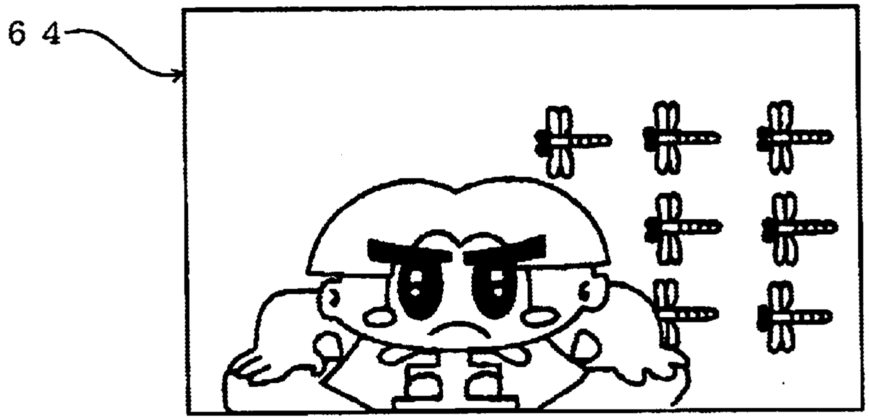
FIG. 31 is a representation that illustrates a display of a "dragonfly reach;"

FIG. 31 is a representation of the "dragon fly prognostic" in which a plurality of dragonflies are displayed crossing behind the "Kintaro".

Figure 32:
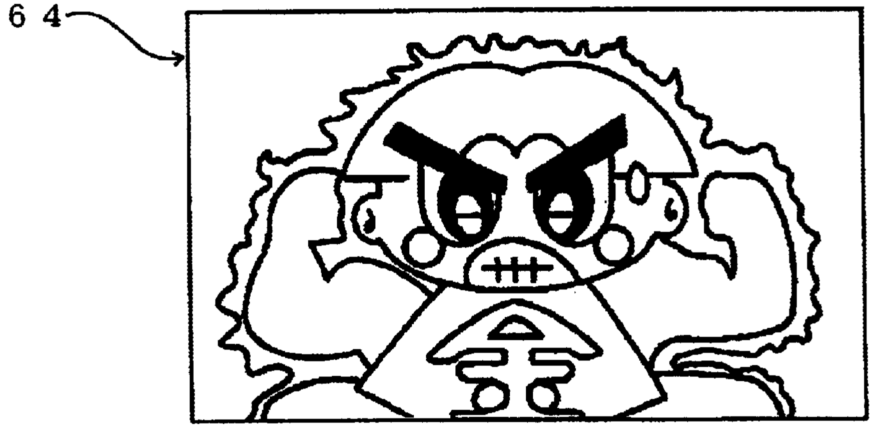
FIG. 32 is a representation that illustrates a display of a "fighting reach;"

FIG. 32 is a representation of the "fighting prognostic" in which "Kintaro" is displayed in his fighting pose.

Figure 33:
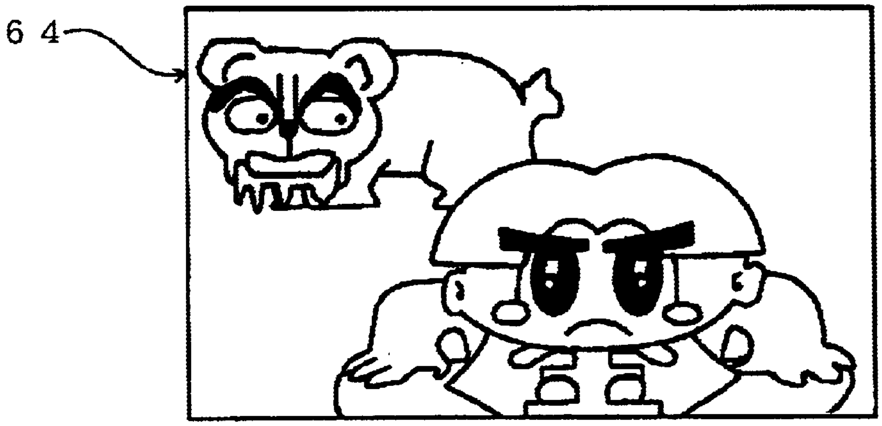
FIG. 33 is a representation that illustrates a display of a "bear reach;"

FIG. 33 is a representation of the "bear prognostic," in which a bear is displayed crossing behind the "Kintaro."

Figure 34:
FIG. 34 is a representation that illustrates a display of a "right leg lifting reach;"
Figure 35:
FIG. 35 is a representation that illustrates a display of a "left leg lifting reach;"

FIGS. 34 and 35 are representations of the "right leg lifting prognostic," and the "left leg lifting prognostic," respectively, which are displayed after the "dragon fly prognostic." When the "right leg lifting prognostic," and the "left leg lifting prognostic," may be combined to "face prognostic 1" and "face prognostic 2" a story line may be provided to the prognostic display.

For example, the "right leg lifting prognostic," includes the movements of "Kintaro" with the lifting of his right leg accompanied with a shout of "Haah" like an initial charge of a Sumo athlete (the timing for this display corresponds to t6 in the timing diagram in FIG. 30), and then returning his leg and hands to the initial posture of the Sumo athlete with a shout as shown in FIG. 19 (the timing for this display corresponds to t9 in the timing diagram in FIG. 30). At this time, the stopping of left reel 63L and the display of "face prognostic 1" are executed.

After the stopping of left reel 63L, the "left leg lifting prognostic" is executed and includes the movements of "Kintaro" lifting his left leg accompanied with a shout of "Haah" similar to that which accompanies an initial charge of a Sumo athlete (the timing for this display corresponds to t 111 in the timing diagram in FIG. 30), and then returning his leg and hands to the initial posture of a Sumo athlete with a shout of eistic as shown in FIG. 19 (the timing for this display corresponds to t 14 in the timing diagram in FIG. 30). At this time, the stopping of right reel 63R and the display of "face prognostic 2" are executed.

When the "left leg lifting prognostic" and the "right leg lifting prognostic" are displayed, left reel 63L stops together with action of the left leg of "Kintaro" and right reel 63R stops together with action of the right leg thereof, thus the relationship between the predictive display and the stop action of the reels can be recognized.

Figure 36:
FIG. 36 is a representation that illustrates a display of a "small degree left leg lifting reach;"

It may be possible to change the likelihood of the appearance of the "BB hit" depending on the degree of the lifting of the leg of "Kintaro." For example, in FIG. 36, "Kintaro" has the posture in which his left leg is lifted to a small extent, and his posture is more like the initial posture of a Sumo athlete. Such a prediction is displayed to indicate that the likelihood of the "BB hit" is low.

The degree of lifting the leg of "Kintaro" can be combined with the change of the facial expression, and thereby the likelihood of the "BB hit" can be indicated as changed. As described above, when the likelihood is indicated by each scene on the story line, the player would pay attention to the prognostic display in conjunction with the ongoing story and the "reach demonstration" as well as the stop display of the variably displayed symbol, whereby the variety of the game is extended and the player's interest in the game is increased.

Prognostics such as the "dragon fly prognostic," the "fighting prognostic," the "bear prognostic," the "left leg lifting prognostic," and the "right leg lifting prognostic," other than the face prognostic are, in this embodiment, determined by using a third random number for the prognostic display determination that is extracted independently from first random numbers extracted in step ST123 and independently from second random numbers extracted in step ST124 in FIG. 7. By referring the combination of the winning rank that internal hit ("BB hit" or "no BB hit" and the kind of "reach demonstration" that has been determined from the prognostic display determination table shown in FIG. 37, there is selected a prognostic display that is associated with the random number value range from which the third random number. Therefore, demonstrations of more complex prognostic displays can be developed, such as a sequential story of prognostic displays beyond only the face prognostic, and can be determined using the random number extraction methodology described herein.

In addition, the random numbers for the determination of the prognostic display are not limited in the practice of the invention to only two or three, as four or more random numbers may be extracted, thereby executing various prognostic displays with the passage of time. This would increase the extent to which the likelihood of the "BB hit" can be changed.

In the foregoing example, since the display mode for the prognostic display is ordered such that "face prognostic 1" is followed by "face prognostic 2" and each prognostic display has a predetermined probability or likelihood of the "BB hit" the likelihood of the "BB hit" may be changed by displaying the face prognostic in the order of "face prognostic 1" followed by "face prognostic 2." In addition, the likelihood of the "BB hit" is associated with each of the face prognostic, and therefore, the likelihood of the "BB hit" is determined for the combination of the face prognostic such as the combination in the order of "face prognostic 1" followed by "face prognostic 2." That is, the prognostic display mode is determined in relation to the likelihood of the "BB hit" and the prognostic display mode is changeable with the change in the game resulting from the passage of time.

The present invention may include embodiments in which the "reach demonstration," as described in the above embodiment, is not executed.

In an embodiment described below, the controller is arranged to display a predictive display mode previously determined in correspondence to the likelihood for predicting appearance of the special display state. The predictive display mode is arranged to be changeable with a change in the game resulting from the passage of time.

Further, the embodiment is arranged so that the player can expect an appearance of the "BB" with a degree of certainty, by arranging the prognostic display to predict the appearance of the "BB" with certainty of 100%, or to display the likelihood of the "BB hit" with 0% which would be indicated by "BB" not appearing;

The present invention includes embodiments in which the likelihood of the "BB hit" corresponding to 100% or 0% is not provided.

FIGS. 38 and 39 show appearance probability tables in which a predetermined likelihood of the "BB hit" is formed by combining a face symbol of "face prognostic 1" with a face symbol of "face prognostic 2" and an appearance probability is associated with each combination of the face prognostic. The letters A, B, C, and D in the tables correspond to A group, B group, C group, and D group, respectively, in face symbol determination table shown in FIG. 2, which will be explained later.

The appearance probability table of FIG. 38 shows cases where the determination of the "BB hit" by the internal hit. As known from the table, the appearance probabilities for combinations of the two face prognostic containing the A group and the B group are high. That is, the face symbols included in the A group and B group are selected from laughing facial expression and "effeminate facial expression," from which it is easy for the player to recognize that the likelihood of the "BB hit" is high. On the other hand, the appearance probabilities for combinations of the two face prognostics containing the C group and the D group are low and in some cases the appearance probability is 0%.

The appearance probability table of FIG. 39 shows instances of the determination of the "no BB hit." As can be seen from the table, the appearance probabilities for the combinations of the two face prognostic containing the C group and the D group are high. That is, the face symbols included in the C and D groups are selected from "ordinary facial expression" and "crying facial expression," and it is easy for the player to recognize there will be a "no BB hit." Also, the appearance probabilities for the combination of the two face prognostic including the A group and the B group are low and in some cases the appearance probability is 0%.

FIG. 40 is a table that shows the likelihood of development into the "BB hit." In other words, the likelihood of development into the "BB" are arranged in correspondence to each combination of the face prognostic.

By way of example, when the combination of the face prognostic corresponds to "A—A" the probability of development into the "BB hit" is 37.11% and the possibility of the appearance of the B is quite high compared with the other combinations. On the other hand, and the probability of development into the "BB hit" for the combinations of "C—C," "C–D," "D–B," "D–C," and "D—D" are extremely close to 0% such as 0.07%, 0.06%, 0.02%, 0.1%, and 0.03%, respectively, the possibility of the appearance of the "BB hit" is extremely low. However, even if a face symbol of the A group has appeared as the first "face prognostic 1" the probability of development into the "BB hit" becomes 0.17% when a face symbol of the D group appears subsequently as "face prognostic 2." As a result, the "BB hit" hardly appears. That is, if a face symbol of the A group first appears as "face prognostic 1" the player expects a higher likelihood of development into the "BB hit" at this time compared to the appearance of a face symbol of the B, C or D group, so that the likelihood of the "BB hit" may be high at this time. At the time when the face prognostic of the D group appear as "face prognostic 2" the likelihood of development into the "BB hit" is changed to a lower value compared with the value at the time of "face prognostic 1" so that the likelihood of the "BB hit" becomes lower compared with at the time of "face prognostic 1".

Even if a face symbol having a low likelihood appears first as "face prognostic 1" the likelihood of development into the "BB hit" may be greatly changed depending on a face symbol that will subsequently appear as "face prognostic 2." For example, even if the face symbol of the A group appears first as "face prognostic 1" the probability of development into the "BB hit" is reduced to as low as 3.17% when a face symbol of the B group appears subsequently as "face prognostic 2." However, if a face symbol of the B group appears as "face prognostic 1" and a face symbol of the B group appears subsequently as "face prognostic 2" the probability of development into the "BB hit" is increased to 18.07%. Thus, even if the face symbols with the low likelihood of development into the "BB hit" appear first, the probability of development into the "BB hit" is sometimes increased depending on the face prognostic that will subsequently appear. As a result, the player will sustain his expectation for the "BB hit" until the last prognostic display symbol appears.

The determination whether or not the display will be developed into the "reach demonstration" with the predetermined probabilities depends on the combination of the prognostic facial expressions. FIG. 41 shows a table in which the likelihood of development into "reach demonstration" are arranged correlated to each combination of the prognostic facial expressions.

For example, 100% probability or likelihood of development into each is associated to each three combinations of "A—A," "A—B," and "B—B." When two of the face prognostic of the A and B groups appear sequentially, the likelihood of subsequent development into "reach demonstration" is very high. However, even in the combination of the A and B groups, the probability is decreased to 25% in the combination of "B–A." Even if a face symbol of the A group has appeared as the first "face prognostic 1," the likelihood of development into each may greatly be changed depending on the face symbol that will subsequently appear as "face prognostic 2." For example, if a face symbol of the A group appears as "face prognostic 2" the probability of development into each is 100%, as mentioned above. However, if a face symbol of the D group appears as face prognostic 2, the probability of development into each becomes 2%. Similar to the likelihood of development into the "BB hit" described above, if a face symbol having a low likelihood of development into each has appeared, the likelihood of development into each is sometimes increased depending on the face symbol that subsequently appears.

When the predetermined prognostic display pattern (combination of the prognostic faces) corresponding to the likelihood of "BB hit" is produced as explained above, the procedure by a controller is different from that shown in FIG. 5. More specifically, the procedures of the random number extraction and the predictive display selection are different from those that are executed in ST102 and ST105 of FIG. 5, respectively. The random number extraction procedure (the second random number extraction procedure) and the predictive display selection procedure (the second predictive display selection procedure) are shown by flowchart in FIGS. 42 and 43, respectively.

Figure 42:
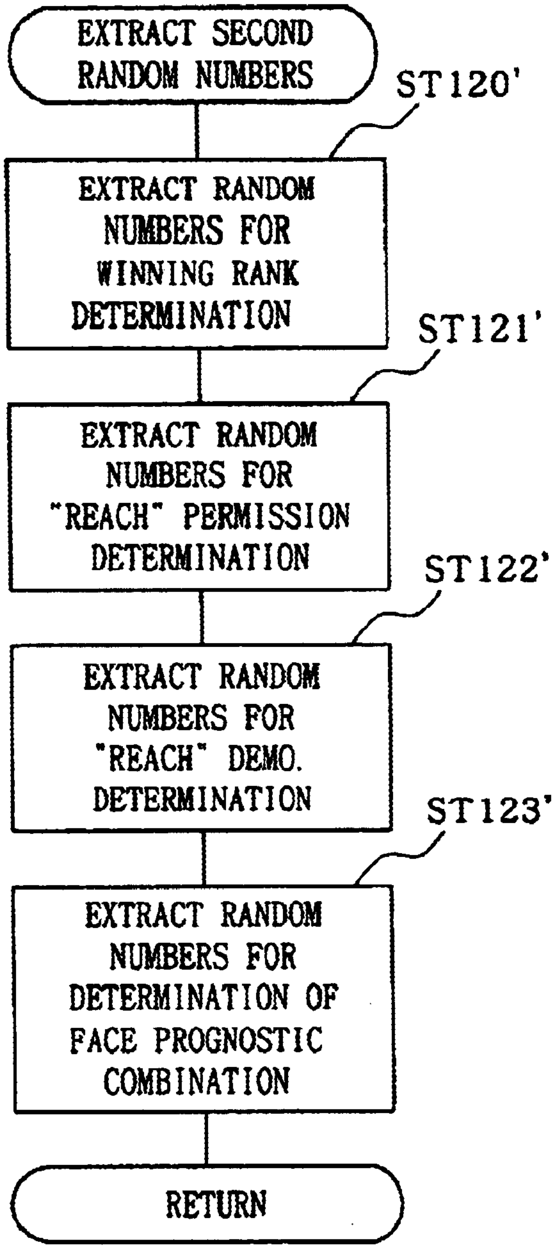
FIG. 42 is a flowchart of a further example for a determination operation procedure for display on the liquid crystal display device of the Pachi-Slo machine of the present invention.

In the second random number extraction procedure shown in FIG. 42, CPU 201 extracts not two random numbers for the "prognostic facial expression" determination (one for the first prognostic display determination and another for the second prognostic display determination) by the random number extraction procedures (ST123 and ST124 of FIG. 7), but one random number for prognostic display determination, that is, a random number for the "prognostic facial expression" determination (ST123'). A range of random number extracted is "0–39" same as the ranges of random number for the first and second predictive display determinations mentioned above.

Figure 43:
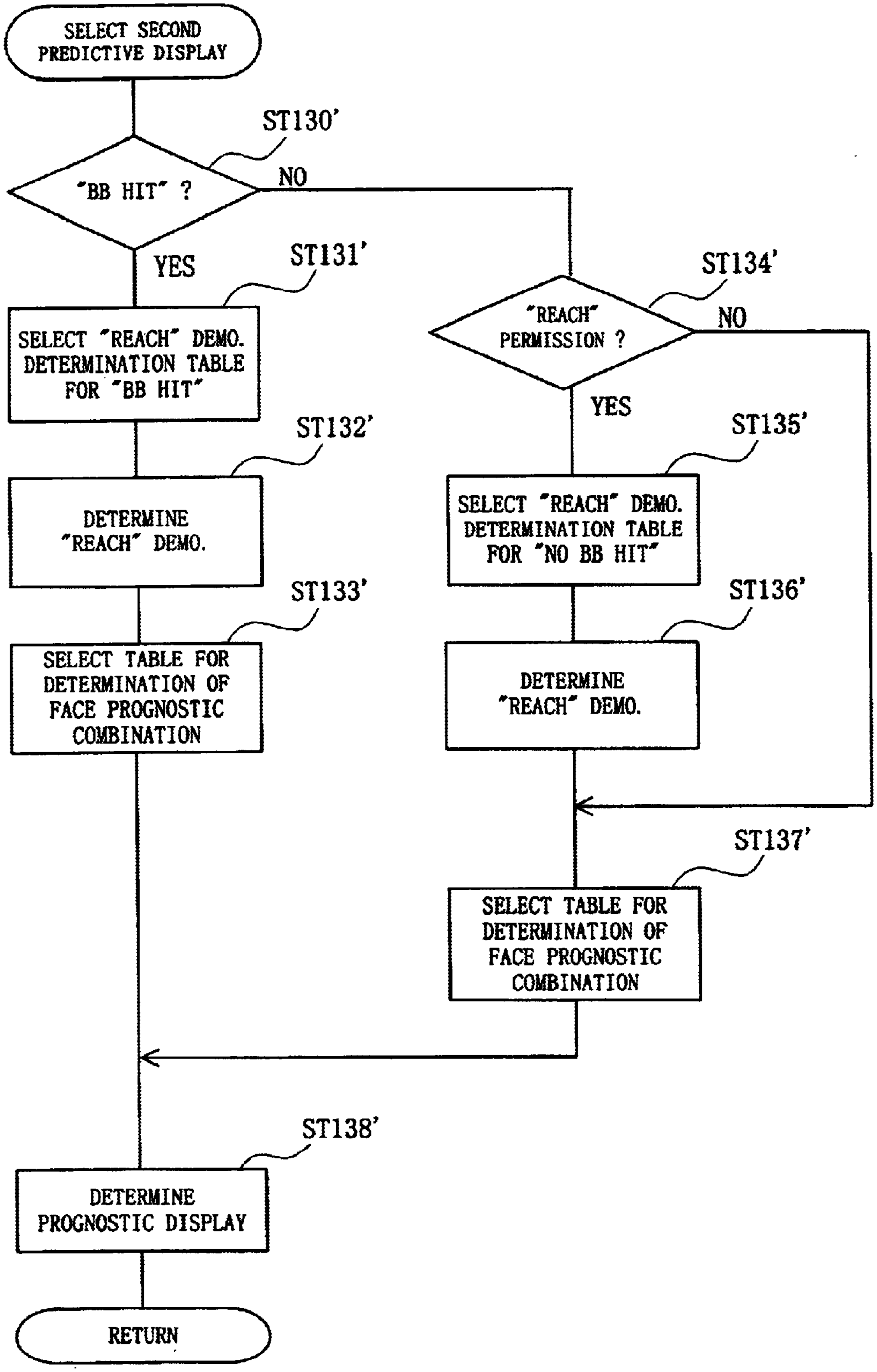
FIG. 43 is a continuation of the flowchart of FIG. 42.

In the second predictive display selection procedure shown in FIG. 43, CPU 201 determines whether or not the internally elected rank is B (ST130'). If the determination is "YES," then CPU 201 selects "reach demonstration determination table for BB hit" shown in FIG. 14 (ST131') and determines a kind of "reach demonstration" to be displayed based on the random number for the "reach demonstration determination" extracted in ST122' of FIG. 42 (ST132').

Based on the "reach demonstration" determined in ST132', CPU 201 selects either of face prognostic combination determination tables of FIGS. 44 to 46 (ST133'). If the "reach demonstration" determined is "clapping reach," "harite reach," or "all rotation reach," CPU 201 selects "face prognostic combination determination table" of FIG. 44 (( ) "BB hit"+"clapping reach"), FIG. 45 ((II) "BB hit"+"harite reach"), or FIG. 46 ((III) "BB hit"+"all rotation reach"), respectively.

If the determination is "NO" in ST130', then CPU 201 determines whether or not each permission is executed (ST134'). If "YES," then CPU 201 selects the "reach demonstration determination table for no BB hit" shown in FIG. 15 (ST135'), and determines the kind of "reach demonstration" to be displayed based on the random number for the "reach demonstration determination" extracted in ST122' of FIG. 42 (ST136').

Based on the "reach demonstration" determined in ST136', CPU 201 selects either of ace prognostic combination determination table" of FIG. 47 or FIG. 48 (ST137'). That is, if the "reach demonstration" determined is "clapping reach" or "harite reach," CPU 201 selects the face prognostic combination determination table of FIG. 47 ((v) "no BB hit"+"clapping reach") or FIG. 48 ((v) "no BB hit"+"harite reach").

If the determination is "NO" in ST134', i.e., the "reach permission is not executed, then CPU 201 does not execute the determination of "reach demonstration" but selects "face prognostic combination determination table" of FIG. 49 ((vi) "no BB hit"+"no reach") (ST137').

Referring to the "face prognostic combination determination table" that is selected in ST133' or ST137', CPU 201 determines which range of random number value in the "face prognostic combination determination table the random number for face prognostic combination determination extracted by the procedure of ST123 belongs to, thus it determines a face prognostic combination to be displayed (ST138').

Next, a procedure for determining the face prognostic combination to be displayed will be 10 explained. The procedure is executed, with reference to the face prognostic determination tables shown in FIGS. 44 to 49, based on the internal winning rank, the selected "reach demonstration" and the extracted random number for the face prognostic display combination determination.

As mentioned above, the random number for the determination of the face prognostic combination is extracted in the range of "0" to "39." In the face prognostic combination determination tables shown in FIGS. 44 to 49, predetermined ranges of random number values are associated with combinations of the two face prognostic ("face prognostic 1"+"face prognostic 2," respectively.

When the case of the "BB hit" and "reach demonstration" corresponds to the "clapping reach" demonstration (I), the face prognostic combination determination table of FIG. 44 is referenced for determining a combination of face prognostic based on the random number extracted for the determination of the prognostic face display combination. If the extracted random number for the determination of the prognostic face display combination belongs to the range of 0 to 11, the combination of the face prognostic of "A—A" is determined. Then, referring to face symbol determination table shown in FIG. 50, face symbol 1-face symbol 1 is selected as the combination of the face prognostic of "A—A" when the extracted random number for the prognostic face display combination determination in the range of 1 to 11 is an even number, (that is, 0, 2, 4, 6, 8, 10). The "face symbol 2"-face symbol 2 is selected when the extracted random number for the prognostic face display combination determination in the range of 1 to 11 is an odd number, (i.e., 1, 3, 5, 7, 9, 11). In the face symbol combination determination table shown in FIG. 20, when the extracted random number for the prognostic face display combination determination is 12, the combination of face prognostic is "A–B." Referring to the A group and the B group in the face symbol determination table of FIG. 50, face symbol 1 is selected as "face prognostic 1" and face symbol 3 is selected as "face prognostic 2," because the random number for the prognostic face display combination determination is an even number.

In the face prognostic combination determination tables of FIGS. 44 to 49, the values of random numbers are not assigned in equal distributions to the various combinations of the face prognostic accommodated in each table. More specifically, each table does not accommodate all of the combinations of the face prognostic, and some combinations are designated to a wider range of random number values as compared to other combinations, whereby some combinations are more often selected.

In each face prognostic combination determination table, the random number value range assigned in this embodiment of the invention to each of the combinations of the face prognostic is not uniform.

For example, the combination of "A—A" is a combination that has a high likelihood of the "BB hit" and hence this combination is accommodated to a greater extent in the face prognostic combination determination tables ((I) of FIG. 44 to (III) of FIG. 46) that are referred to when the "BB hit" determination results in the "BB hit." In other words, the sum of the random number value range for all of the "A—A" combinations accommodated in the face prognostic combination determination table that is referred when the "BB hit" determination results in a "BB hit" is larger than the sum of the random number value range of all of the "A—A" combinations accommodated in the prognostic facial expression combination determination table that is referenced when the "BB hit" determination results in a "no BB hit".

In each of the face prognostic combination determination tables, the random number value range corresponding to the "A—A" combination of the face prognostic is different from the random number value range for the other combinations, and the random number value range associated thereto is also biased (that is, not uniformly distributed) for each of the face prognostic combinations.

Since the combination of "A—A" is not included in the (V) "no BB hit"+"harite reach" of FIG. 48 and in the (VI) "no BB hit"+"no reach" of FIG. 49, if the combination "A—A" should appear, then the combination of "no BB hit" and "harite reach" and the combination of "no BB hit" and "no reach" may not appear.

Since the "BB hit"+"all rotation reach" of (III) in FIG. 46 has associated therewith a relatively high likelihood of the appearance of the "BB hit," the combinations of the face prognostic having low likelihood for appearance of the "BB hit," such as the combination of "D–C" and the combination of "D—D," etc., are not included. Therefore, when the combinations of the face prognostic of "D–C," "D—D," etc. appear, the combination of the "BB hit" and the "all rotation reach" never appear.

By providing the above prognostic display, a player can, through experience, infer detailed information from these prognostic displays. Therefore, by watching a prognostic display, the expert player can determine in some instances that the prognostic display may develop into a particular kind of "reach demonstration," and ultimately develop into the "BB hit" with significant certainty.

In addition to the foregoing, by displaying the first prognostic display ("face prognostic 1") and the second prognostic display ("face prognostic 2") successively with the passage of time, the player will easily remember the change of a series of movements or the change of the face expressions.

Furthermore, the display time of two prognostic displays can be made quite short. In such a case, the interest of the player in the game may be enhanced, because the player is invited to concentrate.

Two or more kinds of prognostic displays may be provided in accordance with the invention, and the mode of the combination also may be selected optionally. The change of the display may be executed in the manner such as, "face prognostic 1"→"face prognostic 2"→"face prognostic 3"→"face prognostic 1."

Although mechanical reels are used in Pachi-Slo machine 60 for the variation display with one 5 winning line, more winning lines may be arranged. In a Pachi-Slo machine that has eight winning lines (three for longitude, three for transverse, and two for slant), for example, a predetermined winning line can be made effective by player selection.

Figure 51:
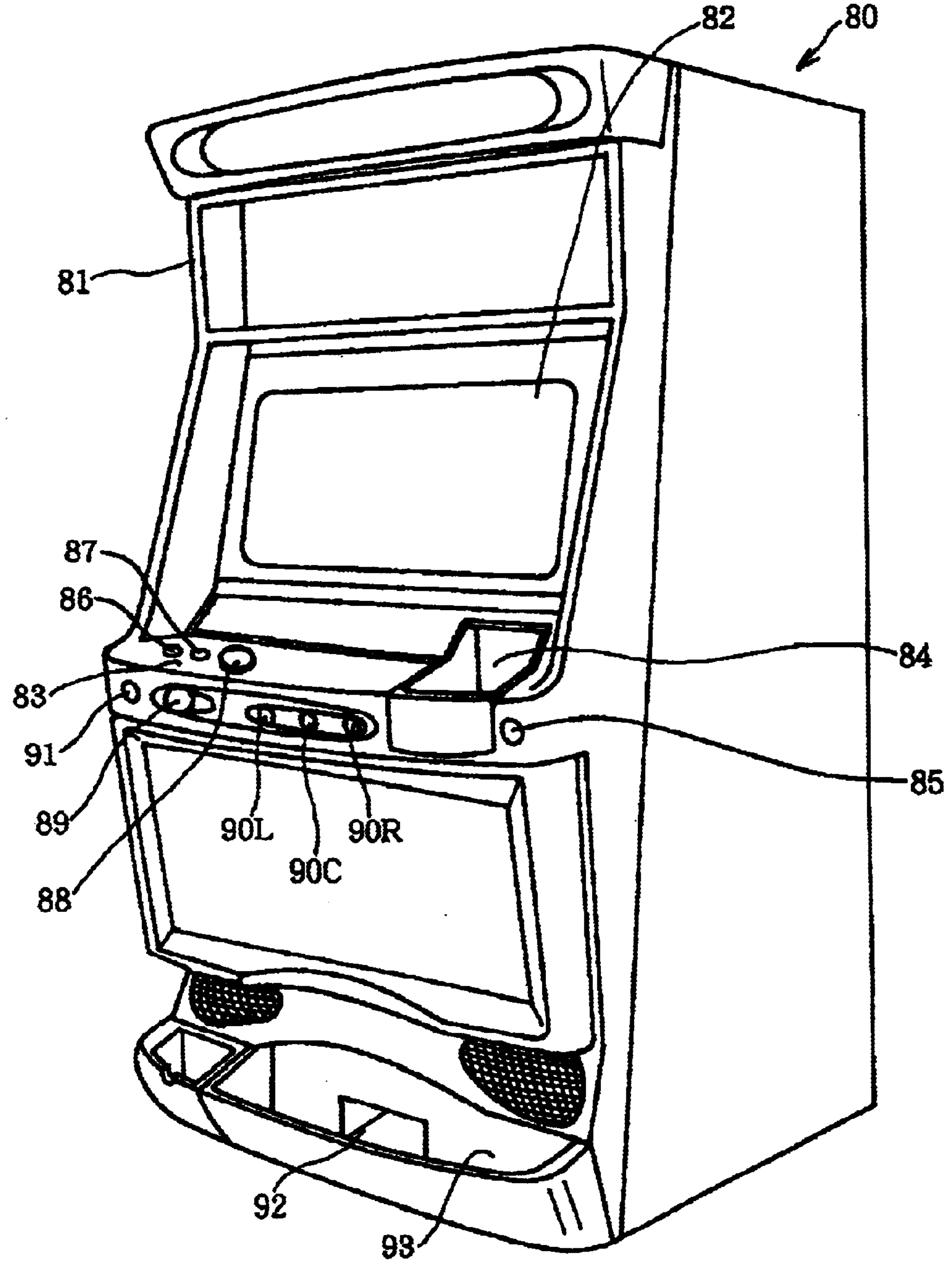
FIG. 51 is a representation of another embodiment of the present invention in the form of a video Pachi-Slo machine.

FIG. 51 is a perspective view of a "video Pachi-Slo" machine which is a type of Pachi-Slo machine that has an electrical display apparatus such as a CRT or a liquid crystal display device for symbol display arrangement and prognostic display arrangement.

Figure 52:
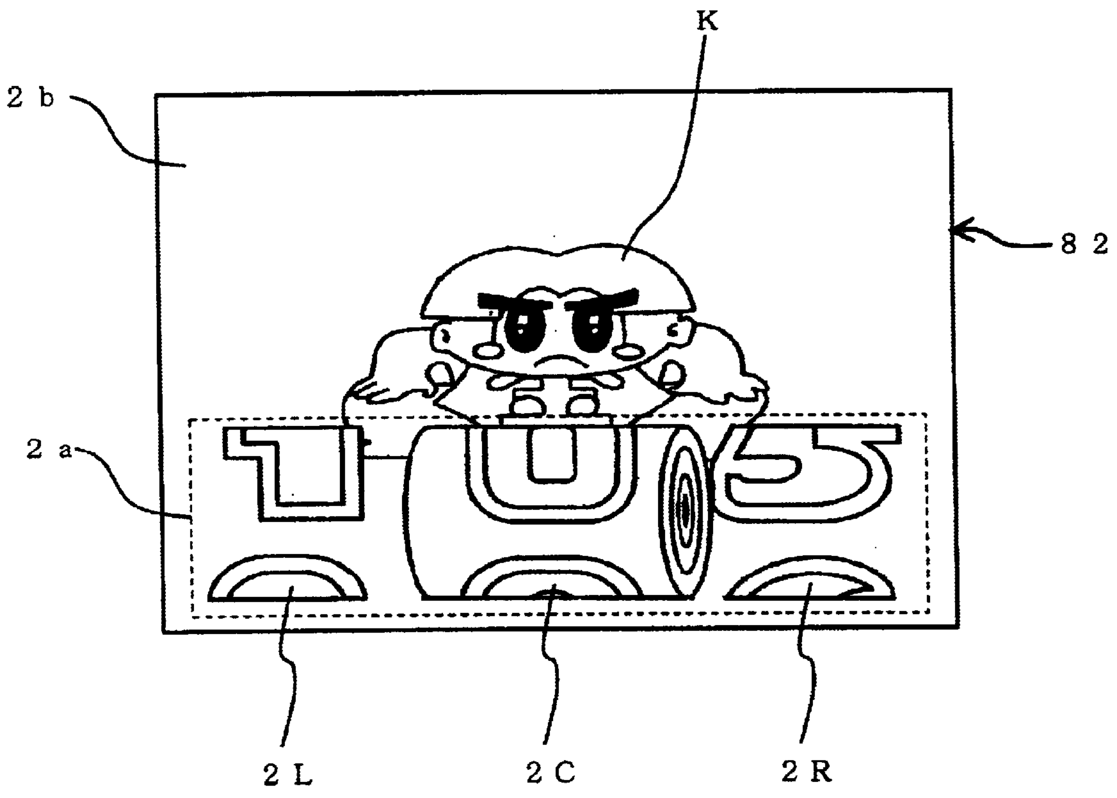
FIG. 52 is a representation of a front view of one screen display.

The video Pachi-Slo 80 has a cabinet 81 and a display apparatus 82 having a rectangular screen arranged in a front of cabinet 81. As shown in FIG. 52, the screen of display apparatus 82 is divided into a symbol variation display portion 2*a* for displaying simulation of three lines of rotation reels of a slot machine and a plurality of symbols, and a predictive display portion 2*b* for indicating the "reach demonstration" or the "prognostic display." That is, video Pachi-Slo 80 is constructed to indicate both of the symbol variation display and the predictive display such as "prognostic display" or "reach demonstration" on one screen.

In this embodiment as shown, symbol variation display portion 2*a* is in the lower position of the screen of liquid crystal display apparatus 82 and predictive display portion 2*b* is in the other area of the screen. FIG. 52 shows an example of the display screen, in which the variable display of symbols is superimposed on the display of "reach demonstration" or the "prognostic display." The symbol variable display portion 2*a* is constituted to indicate variably displayed symbols on three lines of rotation reels simulated by electric signals. The variably displayed symbols are variation symbols 2L (left symbol), 2C (central symbol), and 2R (right symbol) in the left side, center and the right side, which correspond to left reel 63L, central reel 63C and right reel 63R as explained above, respectively. Predictive display portion 2*b* is arrnged to indicate the "reach demonstration" and the "prognostic display" by displaying a symbol, an animation, or a character. In FIG. 52, the prognostic display symbol "Kintaro" K is shown as the "prognostic display."

The "prognostic display" and "reach demonstration" displayed in the predictive display portion 2*b* are the same, in this embodiment, as the contents displayed on liquid crystal display 64 of Pachi-Slo machine 60 described above. FIGS. 53 to 62 show examples of the display on the screen of liquid crystal display apparatus 82.

Figure 53:
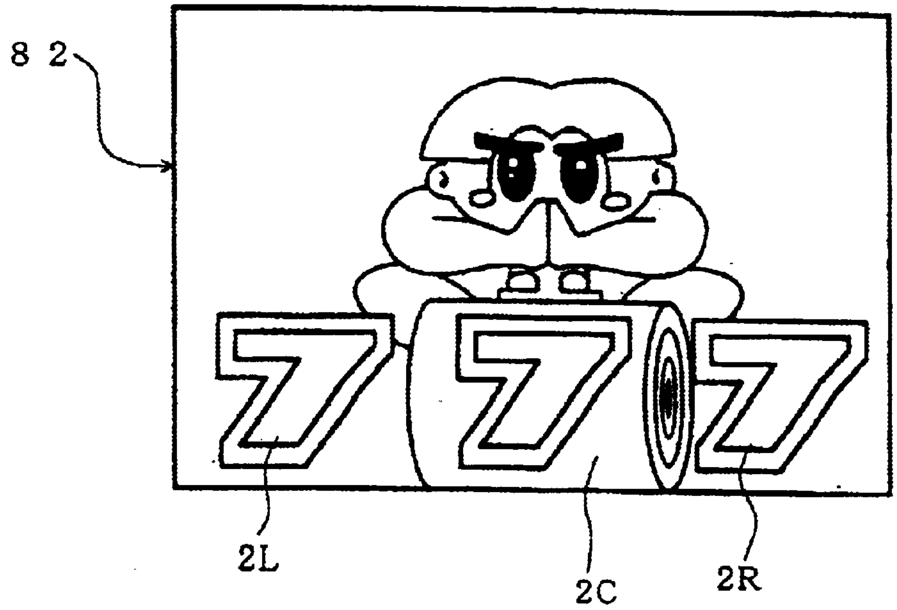
FIG. 53 is a representation that illustrates a display of "clapping reach;"
Figure 54:
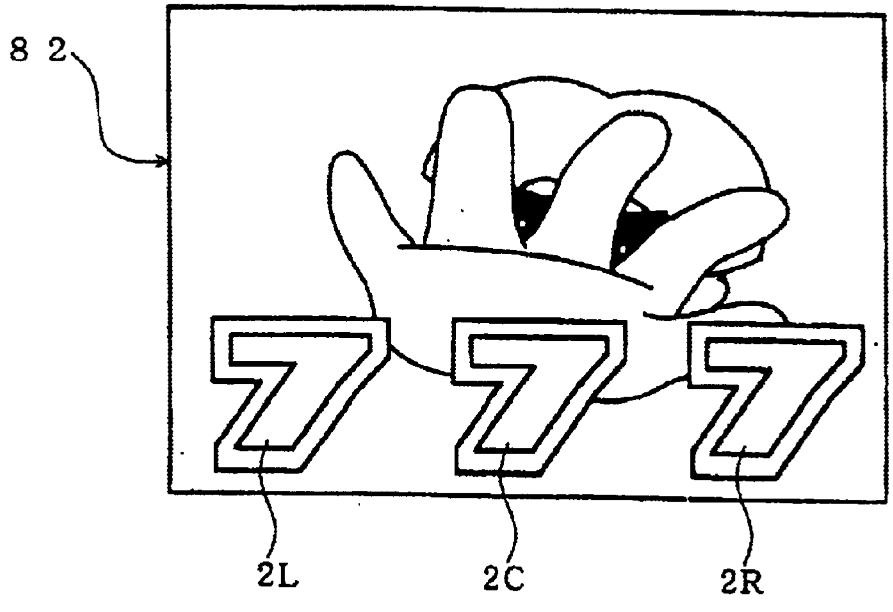
FIG. 54 is a representation that illustrates a display of "harite reach;"

FIGS. 53 and 54 show a "reach state" in which left and right symbols 2L and 2R have been stopped at the same symbols in symbol variation display portion 2*a*, and the "reach demonstration" is displayed in predictive display portion 2*b*. FIG. 53 shows a condition of "Kintaro clapping" where "clapping reach" is displayed in predictive display portion 2*b* for the "reach demonstration." FIG. 54 shows a condition of "Kintaro harite" where "harite reach" is displayed in predictive display portion 2*b* for the "reach demonstration".

Figure 55:
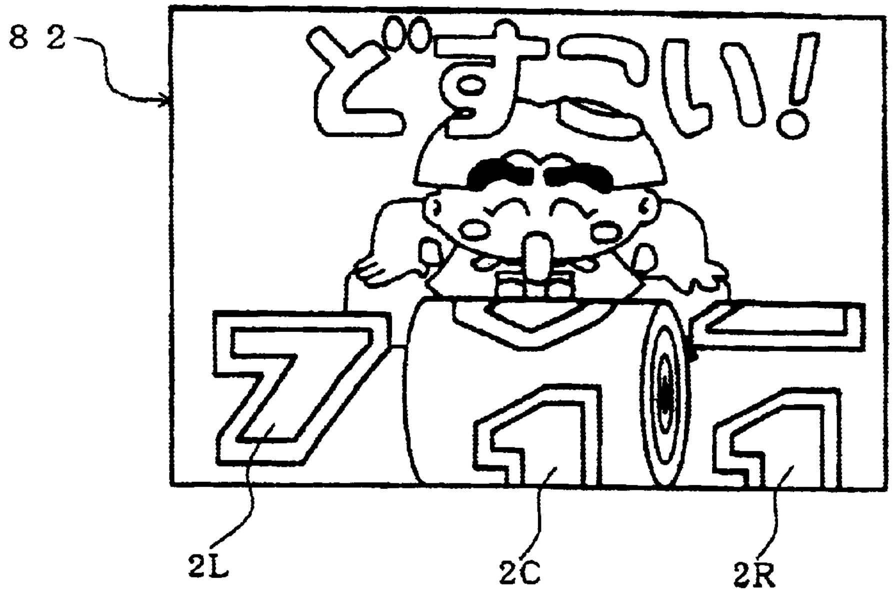
FIG. 55 is a representation that illustrates a display of "prognostic facial expression 1;"
Figure 56:
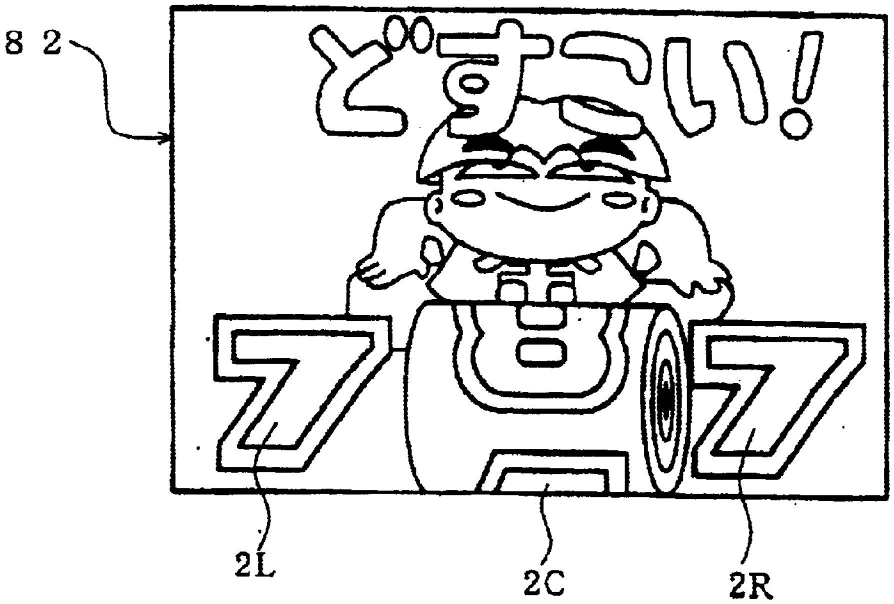
FIG. 56 is a representation that illustrates a display of "prognostic facial expression 2;"

FIG. 55 shows a condition where left symbol 2L has been stopped in symbol variation display portion 2*a* and "first face prognostic 1" is displayed in predictive display portion 2*b*. "Kintaro" is displayed with the laughing facial expression (face symbol 2 of FIG. 2) for the "face prognostic 1." FIG. 56 shows a condition where left and right symbols 2L and 2R have been stopped in symbol variation display portion 2*a* and "face prognostic 2" is displayed in predictive display portion 2*b*. "Kintaro" is displayed with "laughing facial expression" (face symbol 4 of FIG. 2) for the "face prognostic 2."

Figure 57:
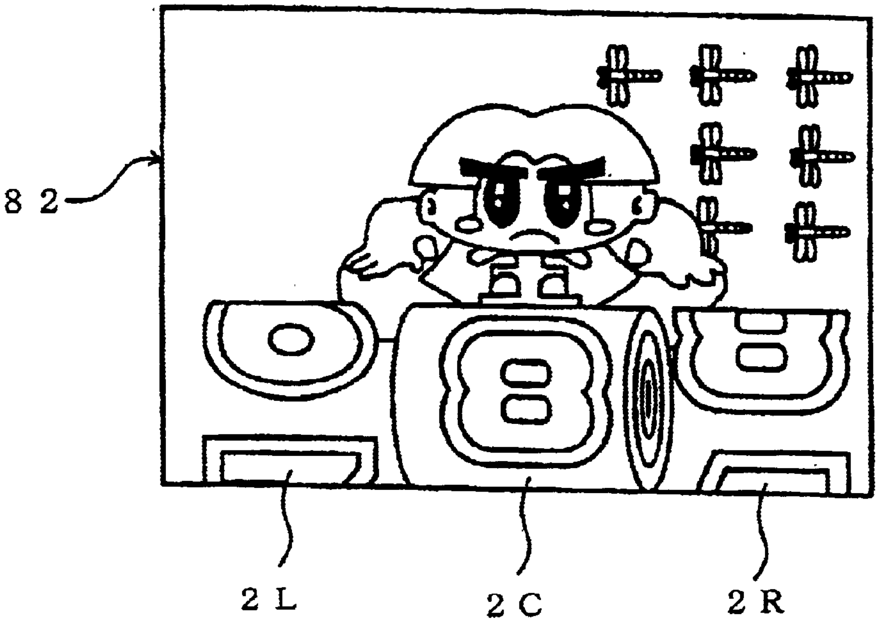
FIG. 57 is a representation that illustrates a display of "dragonfly reach;"

FIG. 57 shows a condition where all of three symbols 2L, 2C, 2R are moving in symbol variation display portion 2*a*, and "dragonfly prognostic" is displayed in predictive display portion 2*b* in which dragonflies are crossing behind the "Kintaro".

Figure 58:
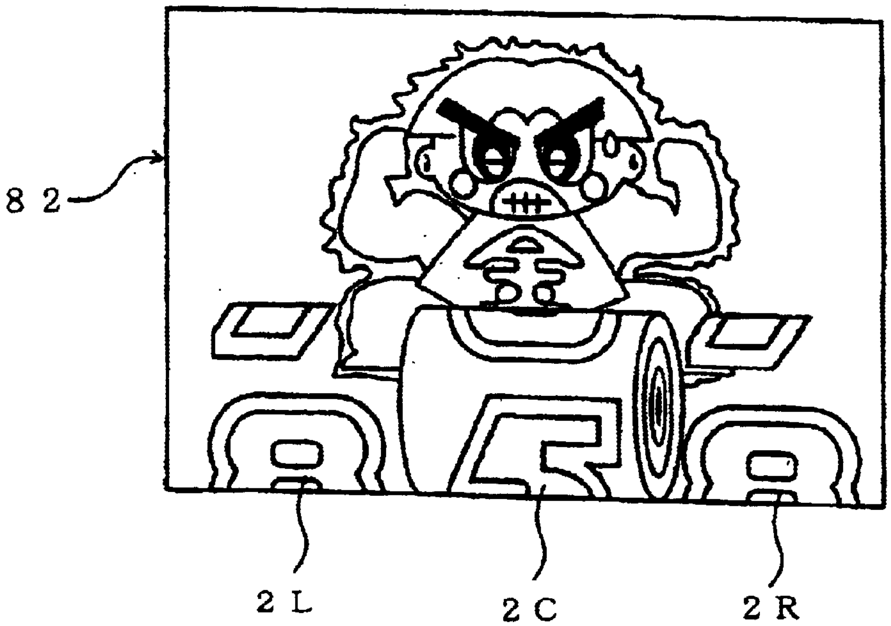
FIG. 58 is a representation that illustrates a display of "fighting reach;"

FIG. 58 shows a condition where all of three symbols 2L, 2C, 2R are moving in symbol variation display portion 2*a*, and "fighting prognostic" is displayed in predictive display portion 2*b* in which the "Kintaro" is in a fighting pose.

Figure 59:
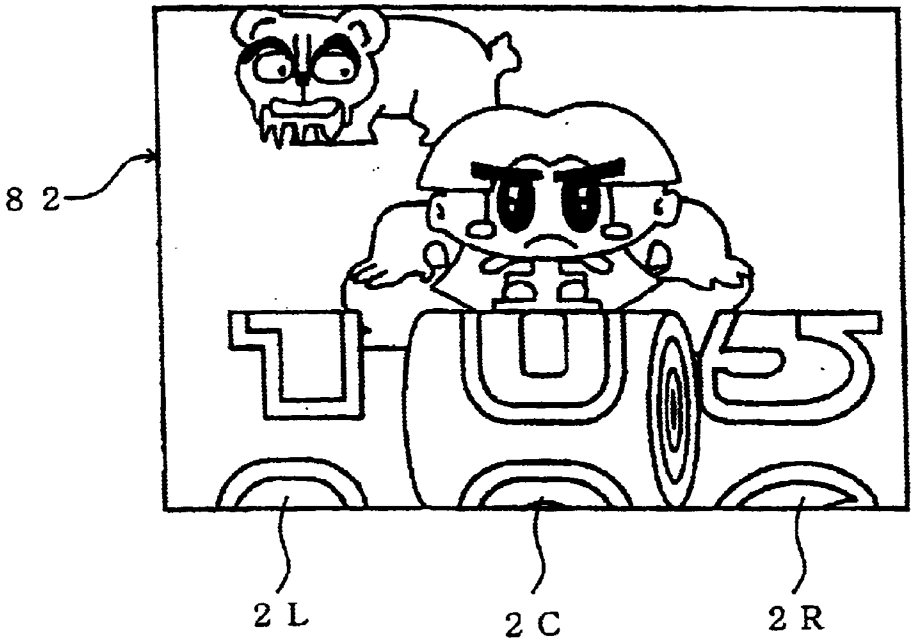
FIG. 59 is a representation that illustrates a display of "bear reach;"

FIG. 59 shows a condition where all of three symbols 2L, 2C, 2R are moving in symbol variation display portion 2*a*, and the "bear prognostic" is displayed in predictive display portion 2*b* in which a bear is crossing behind the "Kintaro".

Figure 60:
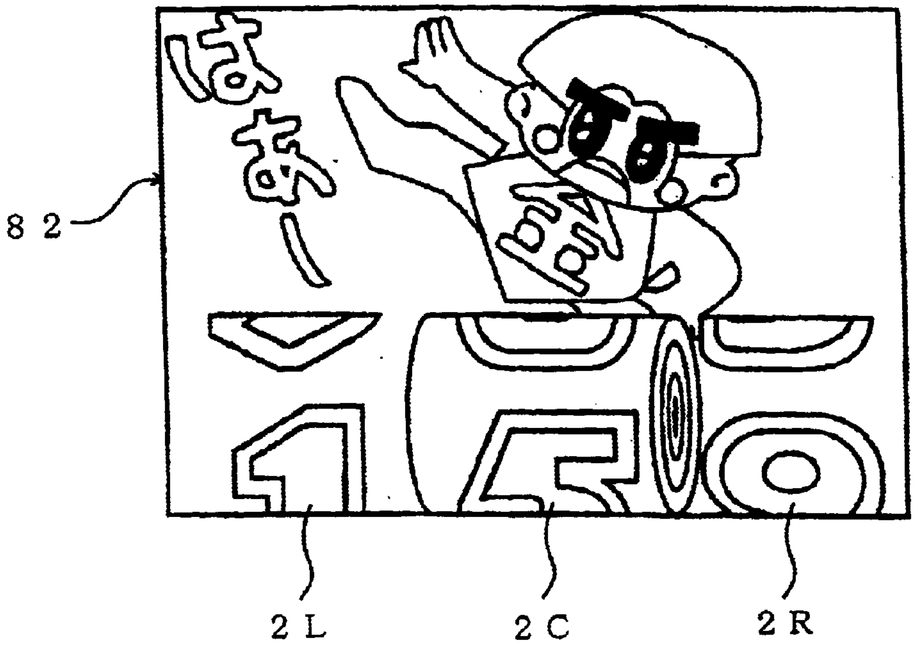
FIG. 60 is a representation that illustrates a display of "right leg lifting reach;"

FIG. 60 shows a condition where all three of symbols 2L, 2C, 2R are moving in symbol variation display portion 2*a*, and "right leg lifting prognostic" is displayed in predictive display portion 2*b* in which "Kintaro" lifts his right leg while shouting "haah" like a Sumo athlete.

Figure 61:
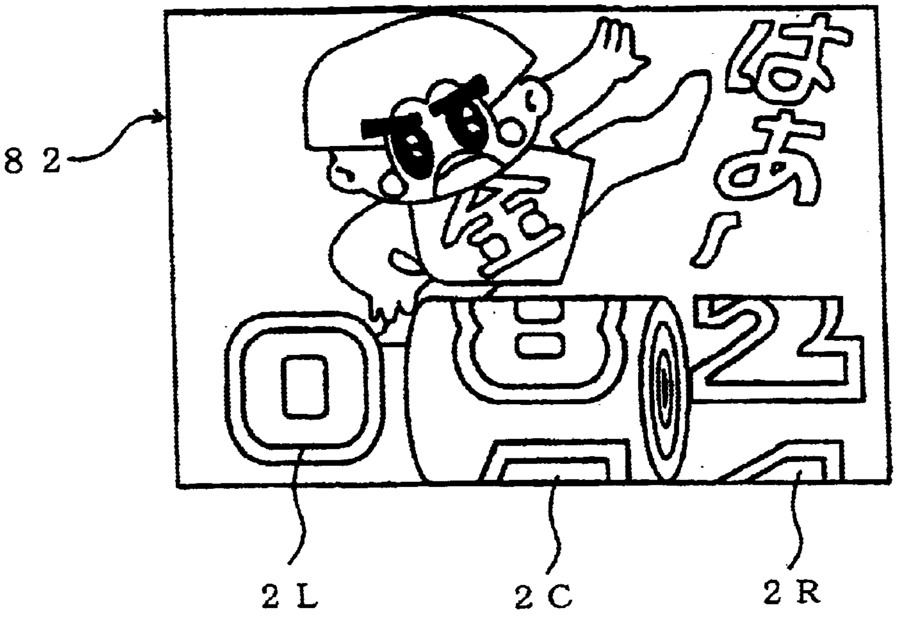
FIG. 61 is a representation that illustrates a display of "left leg lifting reach;"

FIG. 61 shows a condition where all of three symbols 2L, 2C, 2R are moving in symbol variation display portion 2*a*, and "left leg lifting prognostic" is displayed in predictive display portion 2*b* in which the "Kintaro" lifts his left leg while shouting "haah" like a Sumo athlete.

Figure 62:
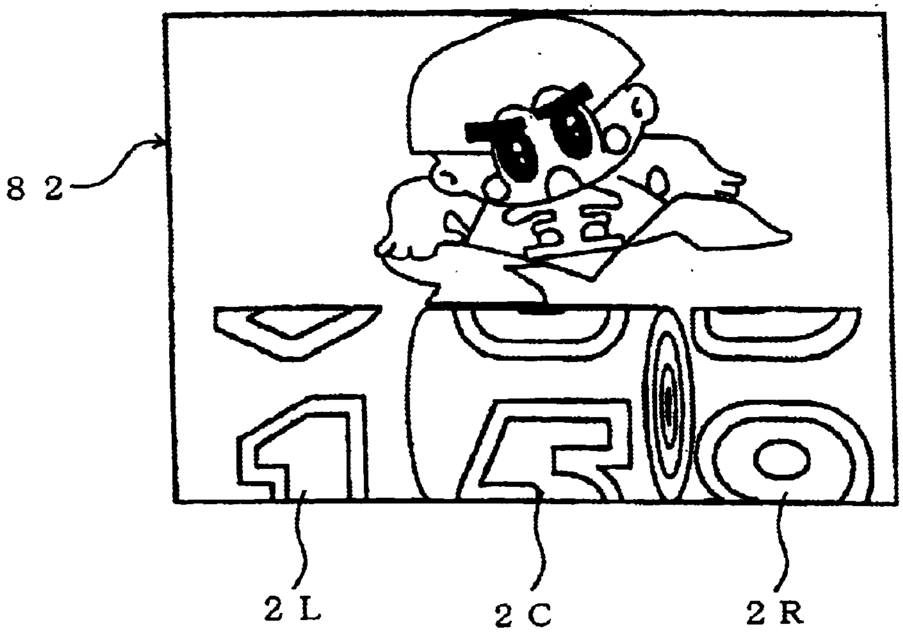
FIG. 62 is a representation that illustrates a display of "small degree left leg lifting reach;"

FIG. 62 shows a condition where all of three symbols 2L, 2C, 2R are moving in symbol variation display portion 2*a*, and "left leg lifting prognostic" is displayed in predictive display portion 2*b* but the "Kintaro" lifts his left leg lower. Such a prediction display indicates that the likelihood of the "BB hit" is low.

The display apparatus that has symbol variation display portion 2*a* and predictive display portion 2*b* may be an electrical display device formed by a plurality of arranged LEDs, a CRT, a plasma display, an electro-luminescence display, or a liquid crystal display, as previously mentioned.

A pedestal portion 83 having a horizontal surface is formed at position lower than display apparatus 82. A bucket-type coin inlet 84 in which a large quantity of coin can be held at a time is disposed in the right side of pedestal portion 83. In the left side of pedestal portion 83, there are a 1-BET switch 86 for betting only one of credited coins for a game, a 2-BET switch 87 for betting two of credited coins for a game, and a "Max-BET" switch 88 for betting possible maximum number of credited coins for a game through one push button manipulation.

For starting symbol variation in the above display in response to manipulation of a player, a start lever 89 that can be moved within a predetermined angle is provided at the left position of the front part of pedestal portion 83. In addition, for stopping each of variation of three lines of displayed symbols in display apparatus 82, three stop buttons 90L, 90C, 90R that are manipulated by a player are arranged in the center of pedestal portion 83. In the right side of pedestal portion 83, a switch 85 for automatically supplying coins to credit portion (not shown) is provided.

To the left of start lever 89, there is a C/P switch 91 for changing credit or pay-out of coins that a player obtained in a game by push button manipulation. If C/P switch 91 is manipulated, coins are paid from a coin outlet 92 of the front lower portion and are collected in a coin receiving portion 93.

Video Pachi-Slo 80 is arranged so that a player can play a game as with Pachi-Slo machine 60. The procedure for the symbol variation display on display apparatus 82 of video Pachi-Slo 80 will be explained below with reference to flowcharts of FIGS. 63 and 64.

Figure 63:
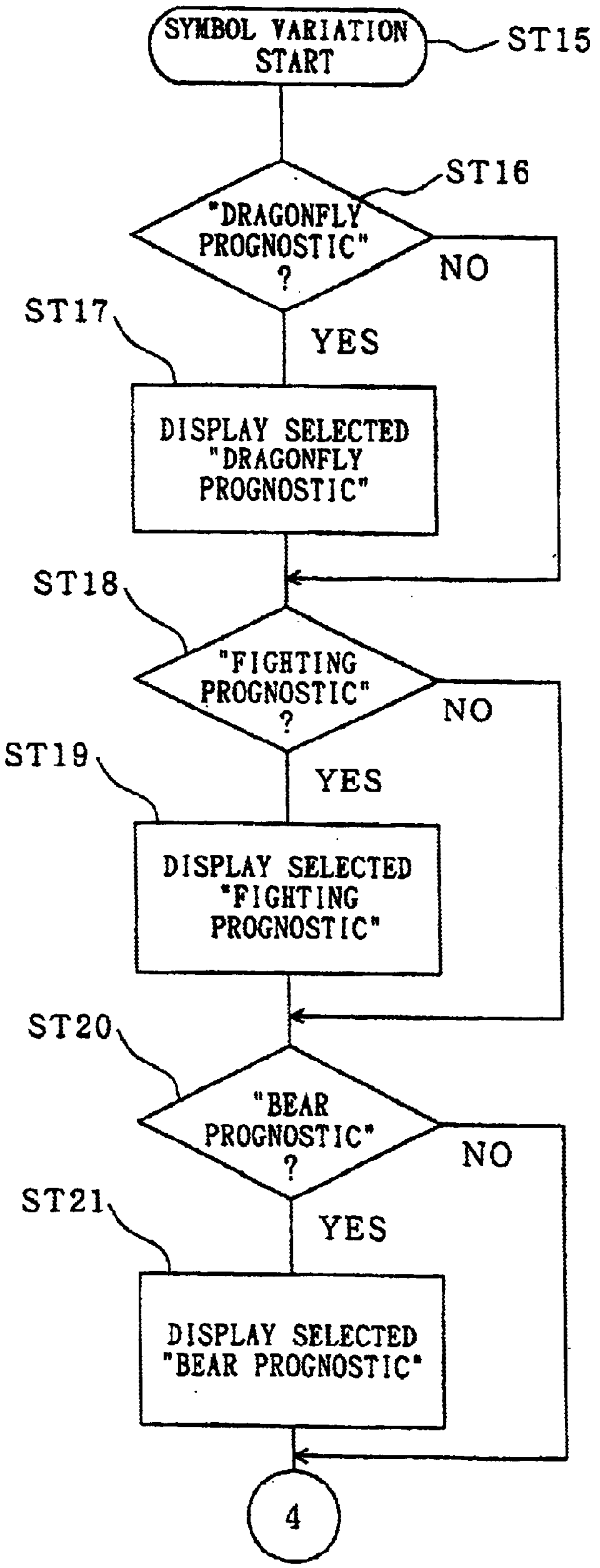
FIG. 63 is a flowchart showing an operation procedure of symbol variation display in the liquid crystal display.

In FIG. 63, the variation of displayed symbols is started (ST15), then a determination is made whether or not the "dragon fly prognostic" is selected (ST16). If the determination is YES the "dragon fly prognostic" shown in FIG. 57 is displayed (ST17). Next, a determination is made as to whether or not the "fighting prognostic" is selected (ST18). If the determination is YES the "fighting prognostic" shown in FIG. 58 is displayed (ST19). Next, a determination is made whether or not the "bear prognostic" is selected (ST20). If the determination is YES the "bear prognostic" shown in FIG. 59 is displayed (ST21).

Figure 64:
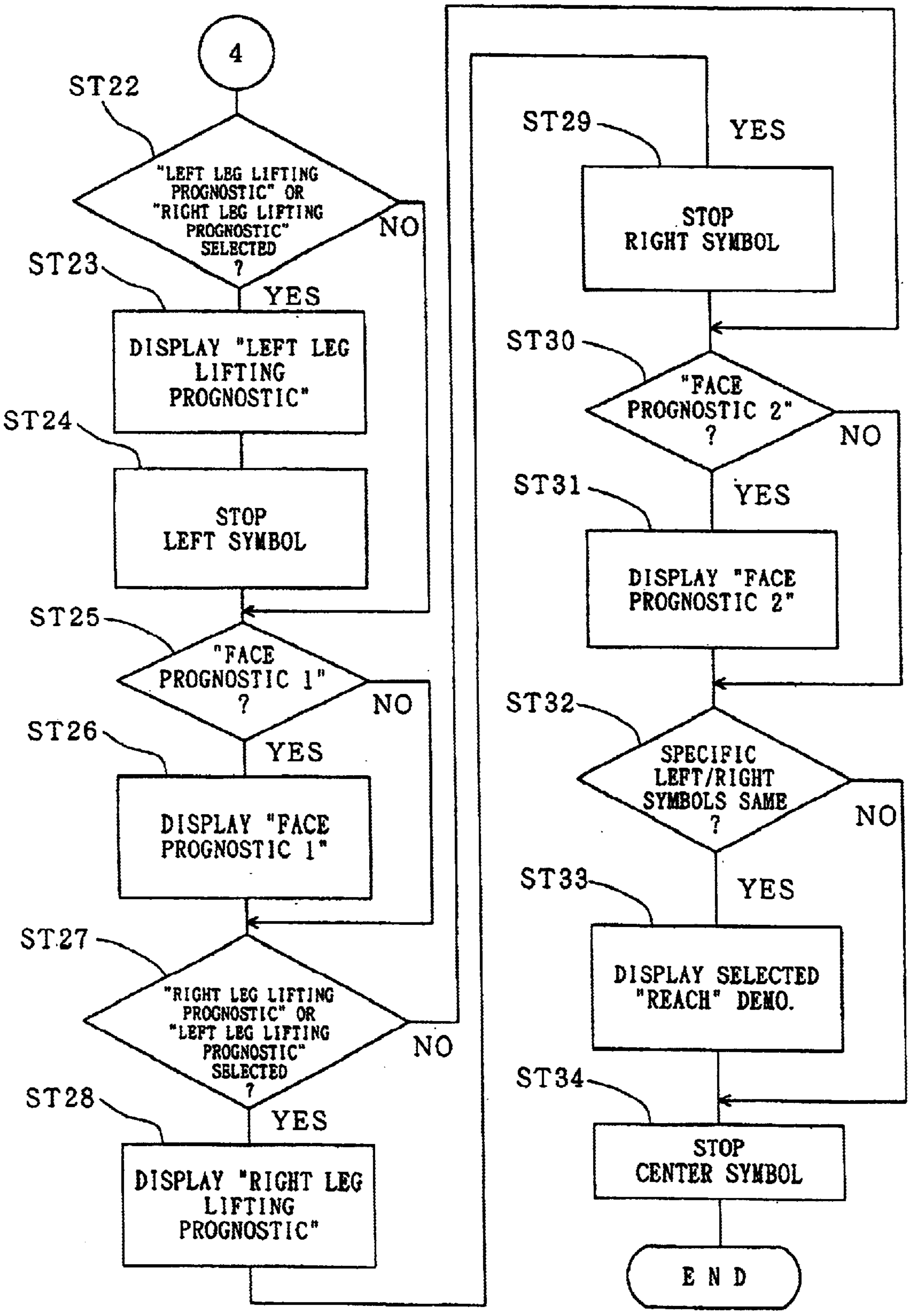
FIG. 64 is a continuation of the flowchart of FIG. 63.

Subsequently, in FIG. 64, the determination is executed as to whether or not the "right leg lifting prognostic" or the "left leg lifting prognostic" is selected (ST22). If the determination is NO the procedure will go to step ST25. If the determination is YES the "right leg lifting prognostic" shown in FIG. 60 is displayed (ST23) and left symbol 2L is stopped (ST24). Next, a determination is made whether or not "face prognostic 1" is displayed (ST25). If the determination is YES, the "face prognostic 1" shown in FIG. 55 is displayed (ST26). Subsequently, a determination is made whether or not the "right leg lifting prognostic" or "left leg lifting prognostic" is selected again (ST27). If the determination is NO the procedure will go to step ST30. If the determination is YES the "right leg lifting prognostic" is displayed (ST28) and right symbol 2R is stopped (ST29).

Next, the determination is executed as to whether or not the "face prognostic 2" is displayed (ST30). If the determination is YES the "face prognostic 2" shown in FIG. 56 is displayed (ST31).

A determination is made as to whether or not the left and right stop symbols are the same (ST32). If the determination is YES the selected "reach demonstration" is displayed (ST33). If "clapping reach" is selected as "reach demonstration" then the "clapping reach" shown in FIG. 53 is displayed. If "harite reach" is selected as "reach demonstration" then the "harite reach" shown in FIG. 54 is displayed. Then, center symbol 2C is stopped (ST34), thereby finishing the display procedure on liquid crystal display 2.

The display timings for the predictive displays are not limited to the timings in the flowcharts explained above, as well as in Pachi-Slo machine 60.

Also, in video Pachi-Slo 80, the control of the game procedures can be executed as well as in Pachi-Slo machine 60, but the symbol variation display is executed in the display apparatus 82. Therefore, it is possible to delete motor drive circuit 305 and reel position detecting circuit 306 in the electric circuit constitution of FIG. 3.

If both of the symbol variation display and the predictive display such as "prognostic display" or "reach demonstration" are executed on the same screen as in video Pachi-Slo 80, then the relationship between the symbol variation display and the predictive display can be recognized well and a player's interest to a game may be increased. Further, since a player would watch the screen intently, the player can easily recognize the predictive display such as "prognostic display" or "reach demonstration" with the passage of time.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A gaming machine for use by a player, the gaming machine comprising:

a symbol display arrangement for variably displaying a plurality of symbols that is arranged to display a stop state when variation of the displayed symbols is stopped and give a profit to the player when the stop state corresponds to a specific stop state;

a predictive display arrangement for performing a predictive display that predicts to the player whether or not the specific stop state is to be displayed when the variation of the displayed symbols is stopped;

a start device for starting the variation of the displayed symbols in response to manipulation by the player;

a stop device for stopping the variation of the displayed symbols in response to manipulation by the player; and a controller for determining whether or not the display of the specific stop state is permitted and for determining a predictive display mode based on the result of the determination, the controller being arranged to control the predictive display arrangement to perform at least two predictive displays sequentially such that a likelihood of appearance of the specific stop state is changeable in conjunction with a change in the game resulting from the passage of time;

wherein the change in the game corresponds to a change in the number of varying symbols of the displayed symbols that are stopped one-after-another in response to a manipulation by the player, the game being started in response to the manipulation of the start device and ended in response to last manipulation of the stop device by the player.

2. The gaming machine according to claim 1, wherein the likelihood of the appearance of the specific stop state is changeable by displaying a plurality of predictive display symbols sequentially with the passage of time.

3. The gaming machine according to claim 2, wherein the plural predictive display symbols are successively displayed.

4. The gaming machine according to claim 3, wherein the successive display of the predictive display symbols depicts a story line.

5. The gaming machine according to claim 1, wherein said controller is provided with a predictive display memory for storing a plurality of predictive display symbol groups, each having the plurality of predictive display symbols, by classifying them in accordance with the likelihood of appearance of the specific stop state.

6. The gaming machine accordingly to claim 1, wherein the likelihood can be changed depending on timing of stopping the variation of the displayed symbols.

7. The gaming machine according to claim 1, wherein the predictive display is performed one or more times until the variation of any one of the variably displayed symbols is stopped.

8. The gaming machine according to claim 1, wherein the predictive display is performed one or more times during a period beginning when the variation of any one of the variably displayed symbols is stopped to the time when the variation of a further one of the variably displayed symbols is stopped.

9. The gaming machine according to claim 1, wherein the predictive display is performed one or more times during a period beginning when the variations of any two of the variably displayed symbols are stopped to the time when the variation of a further one of the variable display symbol is stopped.

10. The gaming machine according to claim 1, wherein the predictive display is performed one or more times until the variation of any one of the variably displayed symbols is stopped and then one or more times until the variation of a further one of the variably displayed symbols is stopped.

11. The gaming machine according to claim 1, wherein the predictive display is performed one or more times until variation of any one of the variably displayed symbols is stopped and then one or more times during a period beginning when the variation of a further one of the variably displayed symbols is stopped to the time when variation of a the further one of the variably displayed symbols is subsequently stopped.

12. The gaming machine according to claim 1, wherein the predictive display is performed one or more times during a period from beginning when the variation of any one of the symbols is stopped to the time when the variation of a further one of the variably display symbols is stopped, and then one or more time until variation of a still further one of the variably displayed symbols is subsequently stopped.

13. The gaming machine according to claim 1, wherein the predictive display is performed one or more times until variation of any one of the variably displayed symbols is stopped, then further one or more times until the variation of a further one of the variably displayed symbols is stopped, and then a further time until the variation of a still further one of the variably displayed symbols is subsequently stopped.

14. The gaming machine according to claim 1, wherein the variable display of symbols and the predictive display are performed in a display screen.

15. A gaming machine for use by a player, the gaming machine comprising:

a plurality of mechanical rotatable reels each provided with a plurality of symbols that are arranged to display a stop state when their rotations are stopped and to give a profit to the player when the stop state corresponds to a specific stop state;

a random number generator for generating a random number;

a start device for extracting the random number and starting the rotations of the reels in response to manipulation by the player;

stop devices for stopping respective rotations of the mechanical rotatable reels in response to each manipulation by the player;

an electrical display arrangement for performing a predictive display to the player irrespective of whether the specific stop state is displayed when the rotations of the reels are stopped; and a controller for determining whether or not the display of the specific stop state is to be permitted, and for determining a predictive display mode based on the result of the determination, the controller being arranged to control the plurality of mechanical rotatable reels to perform at least two predictive displays sequentially such that the likelihood of appearance of the specific stop state is changeable in conjunction with a change in the game resulting from the passage of time;

wherein the change in the game corresponds to a change in the number of rotating reels of the plurality of mechanical rotatable reels that are stopped one-after-another in response to a manipulation by the player, the game being started in response to the manipulation of the start device and ended in response to last manipulation of the stop device by the player.

* * * * *